(12) United States Patent
Pepley et al.

(10) Patent No.: US 12,229,713 B2
(45) Date of Patent: Feb. 18, 2025

(54) METHODS AND APPARATUSES FOR AUTOMATICALLY PALLETIZING AND DEPALLITIZING ITEMS

(71) Applicant: INTELLIGRATED HEADQUARTERS, LLC, Mason, OH (US)

(72) Inventors: David Frederick Pepley, Pittsburgh, PA (US); Mayank Pathak, Pittsburgh, PA (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 483 days.

(21) Appl. No.: 17/379,316

(22) Filed: Jul. 19, 2021

(65) Prior Publication Data

US 2023/0020576 A1    Jan. 19, 2023

(51) Int. Cl.
*G06Q 10/087* (2023.01)
*G06N 5/02* (2023.01)

(52) U.S. Cl.
CPC ............. *G06Q 10/087* (2013.01); *G06N 5/02* (2013.01)

(58) Field of Classification Search
CPC ......... G06Q 10/087; G06N 5/02; G06N 20/00
See application file for complete search history.

(56) References Cited

U.S. PATENT DOCUMENTS

| 10,929,811 | B2 | 2/2021 | Cole et al. |
| 11,514,386 | B1* | 11/2022 | Soles ................. G06Q 30/0635 |
| 2020/0061927 | A1 | 2/2020 | Millhouse et al. |
| 2022/0402139 | A1* | 12/2022 | Pidaparthi ............... B25J 9/163 |
| 2022/0402710 | A1* | 12/2022 | Pidaparthi ............. B25J 9/1671 |

FOREIGN PATENT DOCUMENTS

| CN | 108820901 A | 11/2018 |
| EP | 1566769 A2 | 8/2005 |

* cited by examiner

*Primary Examiner* — Peter Ludwig
*Assistant Examiner* — Reva R Moore
(74) *Attorney, Agent, or Firm* — Alston & Bird LLP

(57) ABSTRACT

Method, apparatuses, and computer program products for automatically determining a placement location or removal location for one or more items is disclosed. An example method comprising generating a plurality of three-dimensional pallet cells for a pallet; generating one or more three-dimensional item cells for each item of a plurality of items; determining a placement location comprising one or more three-dimensional pallet cells for one or more items of the plurality of items; and causing one or more indications describing the placement location for the one or more items of the plurality of items.

19 Claims, 10 Drawing Sheets

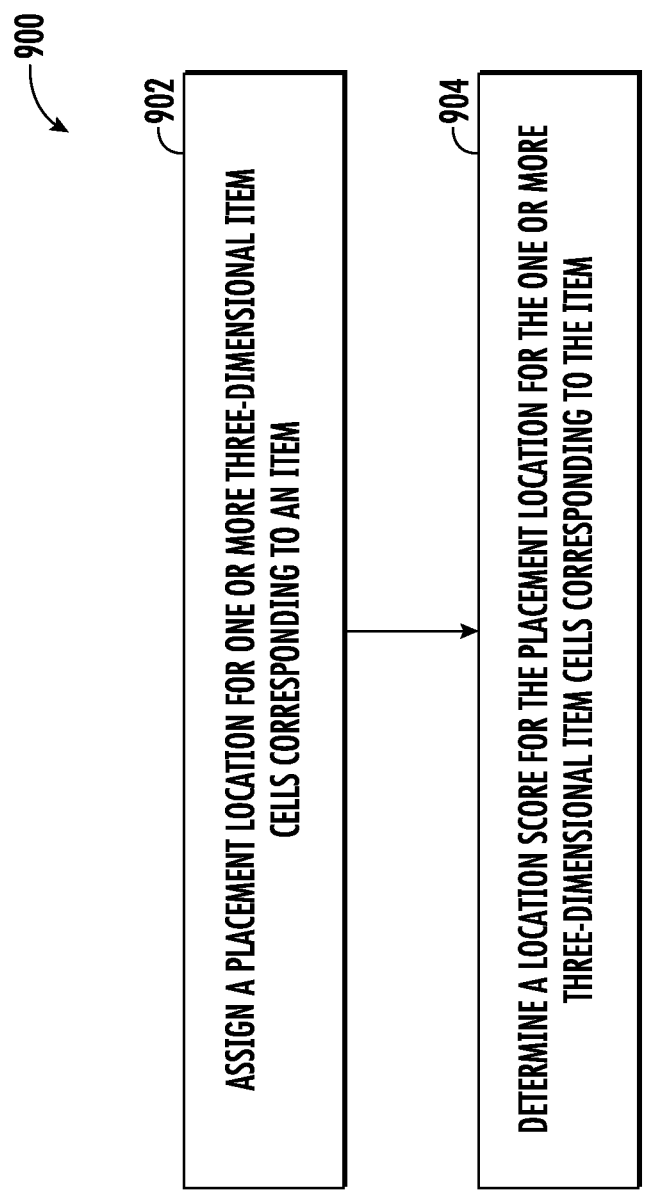

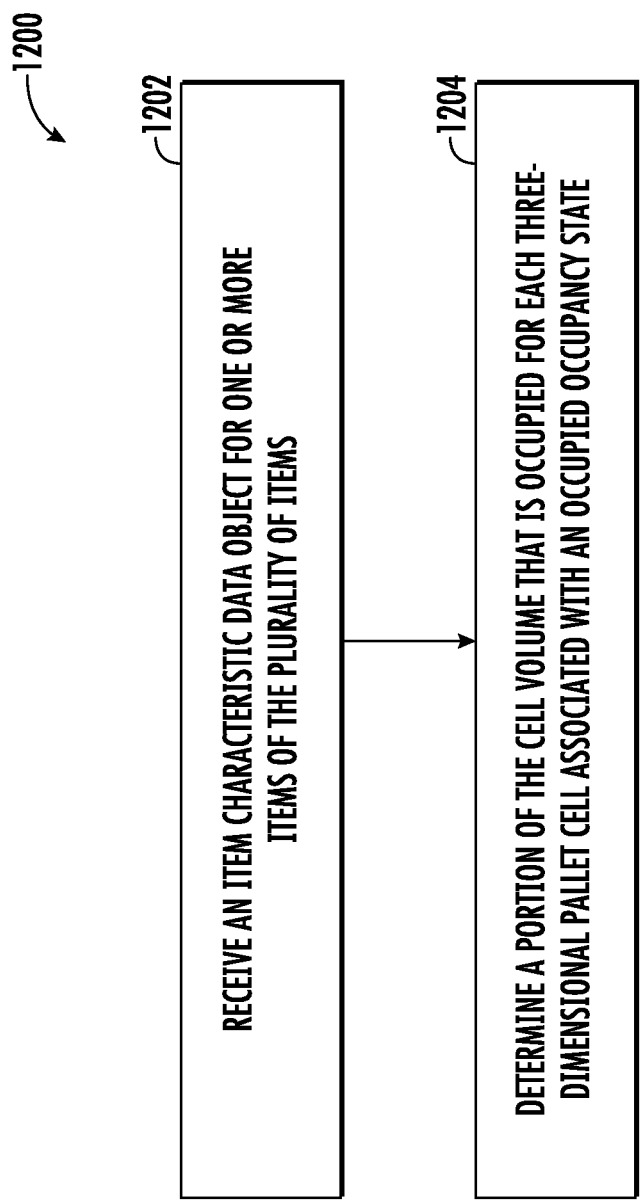

METHODS AND APPARATUSES FOR AUTOMATICALLY PALLETIZING AND DEPALLITIZING ITEMS

BACKGROUND

Current palletization and/or depalletization solutions are typically performed by hand in many distribution centers. Conventionally, such palletization and/or depalletization processes require manual loading or unloading of items from a pallet in order to ensure the stability of the items on the pallet during loading or unloading and to prevent damage to the items, surrounding environment, and/or workers. Mixed item palletization and/or depalletization may require increased stability considerations due to the different characteristics for each item. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to methods, apparatuses, and systems for determining one or more placement locations on a pallet for one or more items of a plurality of items.

In accordance with various examples of the present disclosure, a method, apparatus, and computer program product are disclosed for determining one or more placement locations on a pallet for one or more items of a plurality of items. In this regard, the method, apparatus and computer program product are configured to determine using one or more placement locations each comprising one or more three-dimensional pallet cells for one or more three-dimensional item cells corresponding to one or more items. Further, the method, apparatus and computer program product are configured to cause one or more prediction-based actions to be performed on the one or more items based at least in part on the one or more placement locations.

In an example embodiment, a method is provided that includes generating, using one or more processors, a plurality of three-dimensional pallet cells for a pallet having a pallet volume, wherein the plurality of three-dimensional pallet cells are arranged to segment said pallet volume such that each three-dimensional cell is associated with a cell volume that is at least a portion of the pallet volume. The method also includes generating, using one or more processors, one or more three-dimensional item cells for each item of the plurality of items each having an item volume, wherein each item has a corresponding item volume, and wherein the one or more three-dimensional item cells for each item contains the corresponding item volume. The method further includes determining, using the one or more processors and by utilizing a trained machine learning model, one or more placement locations each comprising one or more three-dimensional pallet cells for one or more three-dimensional item cells corresponding to one or more items. The method further includes causing, using the one or more processors, one or more prediction-based actions to be performed on the one or more items based at least in part on the one or more placement locations.

In some example embodiments, the method further includes updating, using the one or more processors, an occupancy state associated with each of the one or more three-dimensional pallet cells based at least in part on the one or more placement locations determined for the one or more three-dimensional pallet cells corresponding to one or more items. In some embodiments, updating the occupancy state of the one or more three-dimensional pallet cells further comprises receiving, from one or more computing devices, an item characteristic data object for one or more items of the plurality of items, wherein the item characteristic data object describes one or more item characteristics pertaining to the one or more items and determining, using the one or more processors, a portion of the cell volume that is occupied for each three-dimensional cell associated with an occupied occupancy state based at least in part on the item characteristic data object for the one or more items and the determined one or more placement locations for one or more items.

In some embodiments, the trained machine learning model is trained using reinforcement learning techniques. In some embodiments, determining the one or more placement locations of the one or more items further comprises assigning a placement location comprising one or more three-dimensional pallet cells for one or more three-dimensional item cells corresponding to an item and determining a location score for the placement location for the one or more three-dimensional item cells corresponding to the item. In some embodiments, the location score for the placement location is based at least in part on (i) an occupancy state for each of the one or more three-dimensional pallet cells adjacent to the three-dimensional pallet cells comprising the placement location and (ii) an overall volume occupancy of the pallet, wherein the overall volume occupancy is determined based at least in part on the number of three-dimensional pallet cells with an occupied occupancy state.

In some embodiments, each three-dimensional cell of the plurality of three-dimensional pallet cells is associated with an occupancy state. In some embodiments, each three-dimensional cell corresponds to a particular location on the pallet.

In some embodiments, the method further comprises receiving, from one or more computing devices, an item characteristic data object for one or more items of the plurality of items, wherein the item characteristic data object describes one or more item characteristics pertaining to the one or more items. In some embodiments, determining the one or more placement locations is further based at least in part on one or more item characteristics associated with each item of the plurality of items.

In some embodiments, the method further comprises receiving, from one or more computing devices, an item characteristic data object for one or more items of the plurality of items, wherein the item characteristic data object describes one or more item characteristics pertaining to the one or more items. In some embodiments, generating the plurality of three-dimensional pallet cells for the pallet is based at least in part on the item characteristic data object.

In some embodiments, the cell volume for each three-dimensional pallet cells is equivalent and wherein the cell volume is based at least in part on the item associated with the smallest item volume.

In some embodiments, the method further comprises causing, using the one or more processors, one or more indications to be provided to one or more associated computing devices such that the one or more computing devices may place the one or more items on the pallet based at least in part on the one or more determined placement locations.

In an example embodiment, an apparatus is provided including at least one processing component configured to generate a plurality of three-dimensional pallet cells for a pallet having a pallet volume, wherein the plurality of three-dimensional pallet cells are arranged to segment said pallet volume such that each three-dimensional cell is associated with a cell volume that is at least a portion of the pallet volume. The one or more processors of the apparatus are further configured to generate, one or more three-dimensional item cells for each item of the plurality of items each having an item volume, wherein each item has a corresponding item volume, and wherein the one or more three-dimensional item cells for each item contains the corresponding item volume. The one or more processors of the apparatus are further configured to determine, by utilizing a trained machine learning model, one or more placement locations each comprising one or more three-dimensional pallet cells for one or more three-dimensional item cells corresponding to one or more items. The one or more processors of the apparatus are further configured to cause one or more prediction-based actions to be performed on the one or more items based at least in part on the one or more placement locations.

In some example embodiments, the one or more processors of the apparatus are further configured to update an occupancy state associated with each of the one or more three-dimensional pallet cells based at least in part on the one or more placement locations determined for the one or more three-dimensional pallet cells corresponding to one or more items. In some embodiments, the one or more processors of the apparatus are further configured to, when updating the occupancy state of the one or more three-dimensional pallet cells, receive, from one or more computing devices, an item characteristic data object for one or more items of the plurality of items, wherein the item characteristic data object describes one or more item characteristics pertaining to the one or more items and determine, using the one or more processors, a portion of the cell volume that is occupied for each three-dimensional cell associated with an occupied occupancy state based at least in part on the item characteristic data object for the one or more items and the determined one or more placement locations for one or more items.

In some embodiments, the trained machine learning model is trained using reinforcement learning techniques. In some embodiments, the one or more processors of the apparatus are further configured to, when determining the one or more placement locations of the one or more items, assign a placement location comprising one or more three-dimensional pallet cells for one or more three-dimensional item cells corresponding to an item and determine a location score for the placement location for the one or more three-dimensional item cells corresponding to the item. In some embodiments, the location score for the placement location is based at least in part on (i) an occupancy state for each of the one or more three-dimensional pallet cells adjacent to the three-dimensional pallet cells comprising the placement location and (ii) an overall volume occupancy of the pallet, wherein the overall volume occupancy is determined based at least in part on the number of three-dimensional pallet cells with an occupied occupancy state.

In some embodiments, each three-dimensional cell of the plurality of three-dimensional pallet cells is associated with an occupancy state. In some embodiments, each three-dimensional cell corresponds to a particular location on the pallet.

In some embodiments, the one or more processors of the apparatus are further configured to receive, from one or more computing devices, an item characteristic data object for one or more items of the plurality of items, wherein the item characteristic data object describes one or more item characteristics pertaining to the one or more items. In some embodiments, determining the one or more placement locations is further based at least in part on one or more item characteristics associated with each item of the plurality of items.

In some embodiments, the one or more processors of the apparatus are further configured to receive, from one or more computing devices, an item characteristic data object for one or more items of the plurality of items, wherein the item characteristic data object describes one or more item characteristics pertaining to the one or more items. In some embodiments, generating the plurality of three-dimensional pallet cells for the pallet is based at least in part on the item characteristic data object.

In some embodiments, the cell volume for each three-dimensional pallet cells is equivalent and wherein the cell volume is based at least in part on the item associated with the smallest item volume.

In some embodiments, the one or more processors of the apparatus are further configured to cause one or more indications to be provided to one or more associated computing devices such that the one or more computing devices may place the one or more items on the pallet based at least in part on the one or more determined placement locations.

In an example embodiment, a computer program product comprising at least one non-transitory computer-readable storage medium having computer executable program code instructions therein, the computer executable program code instructions comprising program code instructions configured, upon execution, to, generate a plurality of three-dimensional pallet cells for a pallet having a pallet volume, wherein the plurality of three-dimensional pallet cells are arranged to segment said pallet volume such that each three-dimensional cell is associated with a cell volume that is at least a portion of the pallet volume. The computer executable program code instructions comprising program code instructions are further configured, upon execution, to, are further configured to generate, one or more three-dimensional item cells for each item of the plurality of items each having an item volume, wherein each item has a corresponding item volume, and wherein the one or more three-dimensional item cells for each item contains the corresponding item volume. The computer executable program code instructions comprising program code instructions are further configured, upon execution, to, determine, by utilizing a trained machine learning model, one or more placement locations each comprising one or more three-dimensional pallet cells for one or more three-dimensional item cells corresponding to one or more items. The computer executable program code instructions comprising program code instructions are further configured, upon execution, to, cause one or more prediction-based actions to be performed on the one or more items based at least in part on the one or more placement locations.

In some example embodiments, The computer executable program code instructions comprising program code instructions are further configured, upon execution, to, update an occupancy state associated with each of the one or more three-dimensional pallet cells based at least in part on the one or more placement locations determined for the one or more three-dimensional pallet cells corresponding to one or more items. In some embodiments, The computer executable program code instructions comprising program code instructions are further configured, upon execution, to, when updating the occupancy state of the one or more three-dimensional pallet cells, receive, from one or more computing devices, an item characteristic data object for one or more items of the plurality of items, wherein the item characteristic data object describes one or more item characteristics pertaining to the one or more items and determine a portion of the cell volume that is occupied for each three-dimensional cell associated with an occupied occupancy state based at least in part on the item characteristic data object for the one or more items and the determined one or more placement locations for one or more items.

In some embodiments, the trained machine learning model is trained using reinforcement learning techniques. In some embodiments, the computer executable program code instructions comprising program code instructions are further configured, upon execution, to, when determining the one or more placement locations of the one or more items, assign a placement location comprising one or more three-dimensional pallet cells for one or more three-dimensional item cells corresponding to an item and determine a location score for the placement location for the one or more three-dimensional item cells corresponding to the item. In some embodiments, the location score for the placement location is based at least in part on (i) an occupancy state for each of the one or more three-dimensional pallet cells adjacent to the three-dimensional pallet cells comprising the placement location and (ii) an overall volume occupancy of the pallet, wherein the overall volume occupancy is determined based at least in part on the number of three-dimensional pallet cells with an occupied occupancy state.

In some embodiments, each three-dimensional cell of the plurality of three-dimensional pallet cells is associated with an occupancy state. In some embodiments, each three-dimensional cell corresponds to a particular location on the pallet.

In some embodiments, the computer executable program code instructions comprising program code instructions are further configured, upon execution, to, receive, from one or more computing devices, an item characteristic data object for one or more items of the plurality of items, wherein the item characteristic data object describes one or more item characteristics pertaining to the one or more items. In some embodiments, determining the one or more placement locations is further based at least in part on one or more item characteristics associated with each item of the plurality of items.

In some embodiments, the computer executable program code instructions comprising program code instructions are further configured, upon execution, to, receive, from one or more computing devices, an item characteristic data object for one or more items of the plurality of items, wherein the item characteristic data object describes one or more item characteristics pertaining to the one or more items. In some embodiments, generating the plurality of three-dimensional pallet cells for the pallet is based at least in part on the item characteristic data object.

In some embodiments, the cell volume for each three-dimensional pallet cells is equivalent and wherein the cell volume is based at least in part on the item associated with the smallest item volume.

In some embodiments, the computer executable program code instructions comprising program code instructions are further configured, upon execution, to, cause one or more indications to be provided to one or more associated computing devices such that the one or more computing devices may place the one or more items on the pallet based at least in part on the one or more determined placement locations.

Various embodiments described herein relate to methods, apparatuses, and systems for determining one or more removal locations on a pallet for one or more items of a plurality of items.

In accordance with various examples of the present disclosure, a method, apparatus, and computer program product are disclosed for determining one or more removal locations on a pallet for one or more items of a plurality of items. In this regard, the method, apparatus and computer program product are configured to determine using one or more removal locations each comprising one or more three-dimensional pallet cells for one or more three-dimensional item cells corresponding to one or more items. Further, the method, apparatus and computer program product are configured to cause one or more prediction-based actions to be performed on the one or more items based at least in part on the one or more removal locations.

In an example embodiment, a method is provided that includes identifying, using one or more processors, a plurality of three-dimensional pallet cells for a pallet. The method further includes identifying, using one or more processors, one or more three-dimensional item cells corresponding to each item of a plurality of items included within the plurality of three-dimensional pallet cells. The method further includes determining, using the one or more processors and by utilizing a trained machine learning model, one or more removal locations each comprising one or more three-dimensional pallet cells for one or more three-dimensional item cells corresponding to one or more items. The method further includes, causing, using the one or more processors, one or more prediction-based actions to be performed on the one or more items based at least in part on the one or more removal locations.

In some embodiments, the method further includes updating, using the one or more processors, an occupancy state associated with each of the one or more three-dimensional pallet cells based at least in part on the one or more removal locations determined for the one or more three-dimensional pallet cells corresponding to one or more items. In some embodiments, updating an occupancy state of the one or more three-dimensional pallet cells further comprises receiving, from one or more computing devices, an item characteristic data object for one or more items of the plurality of items, wherein the item characteristic data object describes one or more characteristics pertaining to the corresponding one or more items and determining, using the one or more processors, a portion of the cell volume that is occupied for each three-dimensional cell associated with an occupied occupancy state based at least in part on the item characteristic data object for the one or more items and the determined removal location for each item.

In some embodiments, the trained machine learning model is trained using reinforcement learning techniques. In some embodiments, determining the removal of the one or more items further includes assigning a removal location comprising one or more three-dimensional pallet cells for one or more three-dimensional item cells corresponding to an item and determining a location score for the removal location for the one or more three-dimensional item cells corresponding to the item. In some embodiments, the location score for the removal location is based at least in part on an occupancy state for each of the one or more three-dimensional pallet cells adjacent to the three-dimensional pallet cells comprising the placement.

In some embodiments, each three-dimensional cell of the plurality of three-dimensional pallet cells is associated with an occupancy state, and wherein each three-dimensional cell corresponds to a particular location on the pallet In some embodiments, the method further comprises receiving, from one or more computing devices, an item characteristic data object for one or more items of the plurality of items, wherein the item characteristic data object describes one or more item characteristics pertaining to the one or more items. In some embodiments, determining the one or more removal locations is further based at least in part on one or more item characteristics associated with each item of the plurality of items.

In some embodiments, the method further includes causing, using the one or more processors, one or more indications to be provided to one or more associated computing devices such that the one or more computing devices may remove the one or more items on the pallet based at least in part on the one or more determined removal locations.

In an example embodiment, an apparatus is provided including at least one processing component configured to identify a plurality of three-dimensional pallet cells for a pallet. The at least one processing component of the apparatus is further configured to identify one or more three-dimensional item cells corresponding to each item of a plurality of items included within the plurality of three-dimensional pallet cells. The at least one processing component of the apparatus is further configured to determine, by utilizing a trained machine learning model, one or more removal locations each comprising one or more three-dimensional pallet cells for one or more three-dimensional item cells corresponding to one or more items. The at least one processing component of the apparatus is further configured to cause one or more prediction-based actions to be performed on the one or more items based at least in part on the one or more removal locations.

In some embodiments, at least one processing component of the apparatus is further configured to update an occupancy state associated with each of the one or more three-dimensional pallet cells based at least in part on the one or more removal locations determined for the one or more three-dimensional pallet cells corresponding to one or more items. In some embodiments, the at least one processing component of the apparatus is further configured to, when updating an occupancy state of the one or more three-dimensional pallet cells, receive, from one or more computing devices, an item characteristic data object for one or more items of the plurality of items, wherein the item characteristic data object describes one or more characteristics pertaining to the corresponding one or more items and determine, using the one or more processors, a portion of the cell volume that is occupied for each three-dimensional cell associated with an occupied occupancy state based at least in part on the item characteristic data object for the one or more items and the determined removal location for each item.

In some embodiments, the trained machine learning model is trained using reinforcement learning techniques. In some embodiments, at least one processing component of the apparatus is further configured to, when determining the removal of the one or more items, assign a removal location comprising one or more three-dimensional pallet cells for one or more three-dimensional item cells corresponding to an item and determine a location score for the removal location for the one or more three-dimensional item cells corresponding to the item. In some embodiments, the location score for the removal location is based at least in part on an occupancy state for each of the one or more three-dimensional pallet cells adjacent to the three-dimensional pallet cells comprising the placement.

In some embodiments, each three-dimensional cell of the plurality of three-dimensional pallet cells is associated with an occupancy state, and wherein each three-dimensional cell corresponds to a particular location on the pallet In some embodiments, the at least one processing component of the apparatus is further configured to receive, from one or more computing devices, an item characteristic data object for one or more items of the plurality of items, wherein the item characteristic data object describes one or more item characteristics pertaining to the one or more items. In some embodiments, determining the one or more removal locations is further based at least in part on one or more item characteristics associated with each item of the plurality of items.

In some embodiments, the at least one processing component of the apparatus is further configured to cause one or more indications to be provided to one or more associated computing devices such that the one or more computing devices may remove the one or more items on the pallet based at least in part on the one or more determined removal locations.

In an example embodiment, a computer program product comprising at least one non-transitory computer-readable storage medium having computer executable program code instructions therein, the computer executable program code instructions comprising program code instructions configured, upon execution, to, identify a plurality of three-dimensional pallet cells for a pallet. The computer executable program code instructions comprising program code instructions are further configured, upon execution, to, identify one or more three-dimensional item cells corresponding to each item of a plurality of items included within the plurality of three-dimensional pallet cells. The computer executable program code instructions comprising program code instructions are further configured, upon execution, to, determine, by utilizing a trained machine learning model, one or more removal locations each comprising one or more three-dimensional pallet cells for one or more three-dimensional item cells corresponding to one or more items. T The computer executable program code instructions comprising program code instructions are further configured, upon execution, to, cause one or more prediction-based actions to be performed on the one or more items based at least in part on the one or more removal locations.

In some embodiments, the computer executable program code instructions comprising program code instructions are further configured, upon execution, to, update an occupancy state associated with each of the one or more three-dimensional pallet cells based at least in part on the one or more removal locations determined for the one or more three-dimensional pallet cells corresponding to one or more items. In some embodiments, the computer executable program code instructions comprising program code instructions are further configured, upon execution, to, when updating an occupancy state of the one or more three-dimensional pallet cells, receive, from one or more computing devices, an item characteristic data object for one or more items of the plurality of items, wherein the item characteristic data object describes one or more characteristics pertaining to the corresponding one or more items and determine a portion of the cell volume that is occupied for each three-dimensional cell associated with an occupied occupancy state based at least in part on the item characteristic data object for the one or more items and the determined removal location for each item.

In some embodiments, the trained machine learning model is trained using reinforcement learning techniques. In some embodiments, the computer executable program code instructions comprising program code instructions are further configured, upon execution, to, when determining the removal of the one or more items, assign a removal location comprising one or more three-dimensional pallet cells for one or more three-dimensional item cells corresponding to an item and determine a location score for the removal location for the one or more three-dimensional item cells corresponding to the item. In some embodiments, the location score for the removal location is based at least in part on an occupancy state for each of the one or more three-dimensional pallet cells adjacent to the three-dimensional pallet cells comprising the placement.

In some embodiments, each three-dimensional cell of the plurality of three-dimensional pallet cells is associated with an occupancy state, and wherein each three-dimensional cell corresponds to a particular location on the pallet In some embodiments, the computer executable program code instructions comprising program code instructions are further configured, upon execution, to, receive, from one or more computing devices, an item characteristic data object for one or more items of the plurality of items, wherein the item characteristic data object describes one or more item characteristics pertaining to the one or more items. In some embodiments, determining the one or more removal locations is further based at least in part on one or more item characteristics associated with each item of the plurality of items.

In some embodiments, the computer executable program code instructions comprising program code instructions are further configured, upon execution, to, is further configured to cause one or more indications to be provided to one or more associated computing devices such that the one or more computing devices may remove the one or more items on the pallet based at least in part on the one or more determined removal locations.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which:

FIG. 9 is a flowchart diagram representing an example process for determining a location score for a placement location of an item in accordance with various embodiments of the present disclosure;

FIG. 12 is a flowchart diagram representing an example process for determining a portion of a cell volume that is occupied in accordance with various embodiments of the present disclosure.

DETAILED DESCRIPTION OF THE INVENTION

Figure 1:
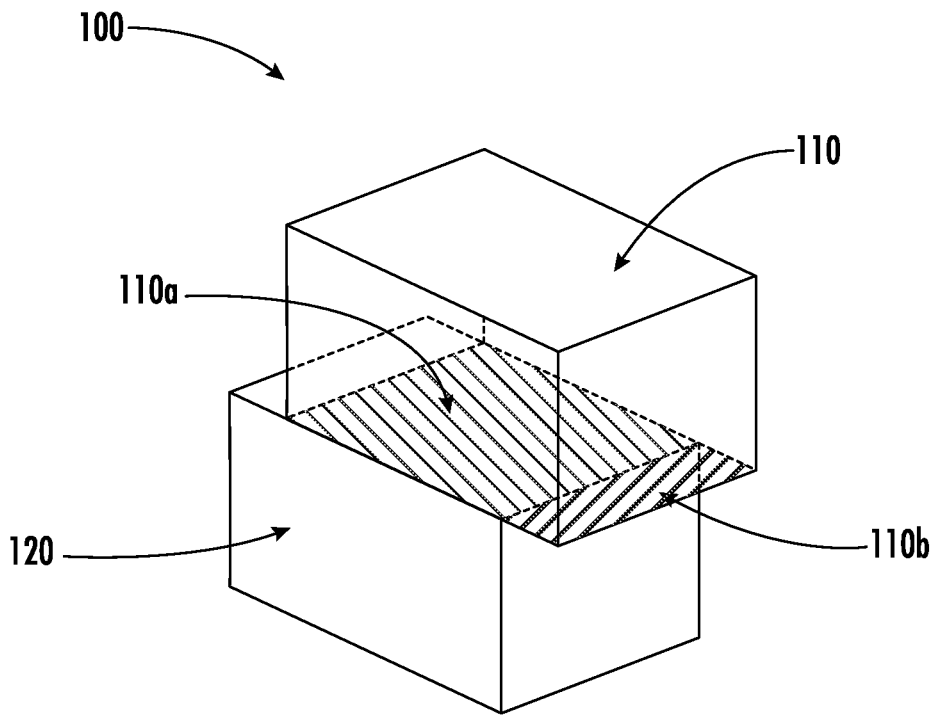
FIGS. 1-2 illustrate an example item placement in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the present disclosure described herein such that embodiments may include fewer or more components than those shown in the figures while not departing from the scope of the present disclosure. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such components or features may be optionally included in some embodiments, or may be excluded.

The term "electronically coupled" or "in electronic communication with" in the present disclosure refer to two or more electrical elements (for example, but not limited to, a computational platform, predictive data analysis system, sensing unit, warehouse management system, and control unit) and/or electric circuit(s) being connected through wired means (for example but not limited to, conductive wires or traces) and/or wireless means (for example but not limited to, wireless network, electromagnetic field), such that data and/or information (for example, electronic indications, signals) may be transmitted to and/or received from the electrical elements and/or electric circuit(s) that are electronically coupled.

Items, such as boxes, packages, containers, and/or the like, may be placed onto a pallet, skid, flat transport structure or the like in a process commonly known as palletization. The palletization of the items facilitates transport of the items in bulk from one location to another. For example, a brick and mortar shopping facility may purchase tens to hundreds of different items from a manufacturer and said manufacture may place all or a subset of the ordered items onto one or more pallets for delivery. Once delivered to the desired location, the items may be removed from the pallet in a process known as depalletization.

Palletization and/or depalletization of items onto or off from a pallet requires items to remain stable on the pallet during the palletization process, during the depalletization process, and in-between the two processes. While it may be beneficial to include a large number of items on the pallet to reduce the number of pallets that are needed to transport items, the stability of the items on the pallet must also be considered. If items on the pallet are not stable, the items may fall from the pallet and become damage, damage the surrounding environment, and/or injure workers or bystanders.

Due to such safety concerns, current palletization and/or depalletization solutions are typically performed by hand in many distribution centers. However, such manual processes of loading/unloading items onto and/or off from pallets may be time-consuming and inefficient as well as potentially hazardous to workers. As such, there is a need, in some examples, to automate such palletization and/or depalletization processes.

While several automated palletization and/or depalletization solutions exist, such solutions are limited and do not provide consideration of the stability of the items on the pallet. Furthermore, such solutions do not allow for the consideration of item types with non-rectangular shapes and therefore lack flexibility to accommodate for scenarios where one or more items to be palletized or depalletized are non-rectangular. Additionally, such solutions lack the ability for mixed item palletization/depalletization processes which require consideration of different characteristics between items, including items of different shapes, weights, dimensions, etc.

As such, it is beneficial, in some examples, to automatically determine a placement location for one or more items on a pallet for a palletization process. To that end, aspects of the present disclosure, in some examples, provide a system and method for determining a placement location for one or more items of a plurality of items. In order to determine a placement locations, a plurality of three-dimensional pallet cells corresponding to a particular location on the pallet may be generated for a pallet having a pallet volume. Each three-dimensional cell of the plurality of three-dimensional pallet cells may be associated with an occupancy state. Further, one or more three-dimensional item cells for each item of the plurality of items may be generated. Then, using a trained model, such as a machine learning model, a placement location comprising one or more three-dimensional pallet cells may be determined for one or more items. The placement location for the one or more items may then be output. In this way, the placement location for one or more items may automatically be determined and communicated.

Additionally or alternatively, it is also be beneficial, in some examples, to automatically determine a removal location for one or more items on a pallet for a depalletization process. Similarly, the present disclosure, in some examples, provides a system and method for determining a removal location for one or more items of a plurality of items. A plurality of three-dimensional pallet cells corresponding to a particular location on the pallet may be identified for a pallet having a pallet volume. Each three-dimensional cell of the plurality of three-dimensional pallet cells may be associated with an occupancy state. Further, one or more three-dimensional item cells for each item of the plurality of items may be identified. Then, using a trained machine learning model, a removal location comprising one or more three-dimensional pallet cells may be determined for one or more items. The removal location for the one or more items may then be output. In this way, the removal location for one or more items may similarly automatically be determined and communicated.

FIG. 1 depicts an example item configuration 100 depicting an item 110 adjacent to item 120. As previously mentioned, the stability of items on a pallet plays an important role in in palletization and/or depalletization process. The stability of items may be influenced by a variety of factors. One such factor is the items adjacent to a particular item. For example, item 110 may be stacked on top of item 120 such that item 120 is adjacent to item 110. The most stable configuration for stacking the items may be the configuration where the bottom-most surface of item 110 (i.e., both surfaces 110a and 110b) completely overlap the top-most surface of item 120. However, such a configuration may not always be possible, particularly when stacking items of different shapes, sizes, dimensions, etc. As such, the item 110 may be stacked upon item 120 such that the bottom-most surface 110a overlaps the top-most surface of item 120 but the bottom-most surface 110b does not. However, the configuration 100 depicted may still be a stable configuration. Further, the configuration 100 depicted in FIG. 1 may additionally allow for more items to be stacked upon the pallet as compared to a configuration where the bottom-most surface of item completely overlap the top-most surface of item 120.

Figure 2:
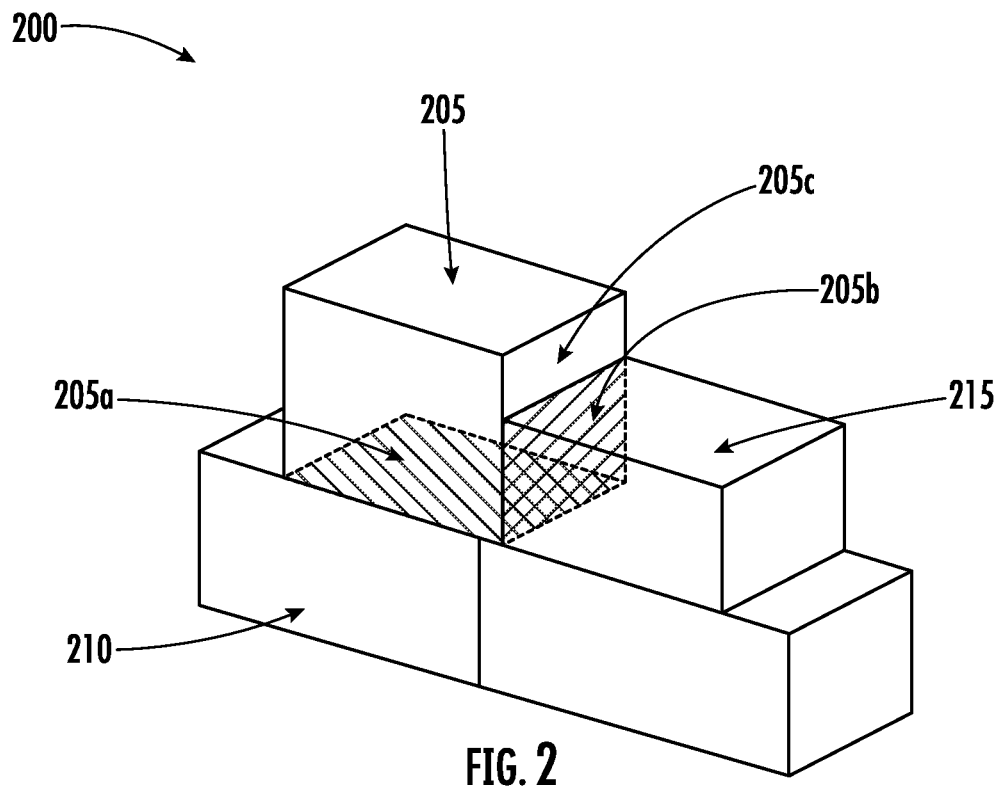

Furthermore, FIG. 2 depicts another example item configuration 200 depicting an item 205 adjacent to item 210 and to item 215. Here, the bottom-most surface 205a of item 205 completely overlaps the top-most surface of item 210. In addition to this bottom-most surface overlap, another factor that may affect the stability of items on a pallet is the amount of overlap between the side surfaces of an item and an adjacent item. One or more items adjacent to an item may prevent or otherwise minimize the amount an item slides or moves on a pallet, therefore increasing the overall pallet stability. For example, the side surface 205b of item 205 may overlap with the side surface of item 215 such that the item 205 is prevented from sliding. Other factors influencing the stability of items may include but are not limited to the item shape, item weight, item weight distribution, item dimensions, pallet dead space, pallet dimensions, weight rating of the pallet, and/or the like.

Example embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Figure 3:
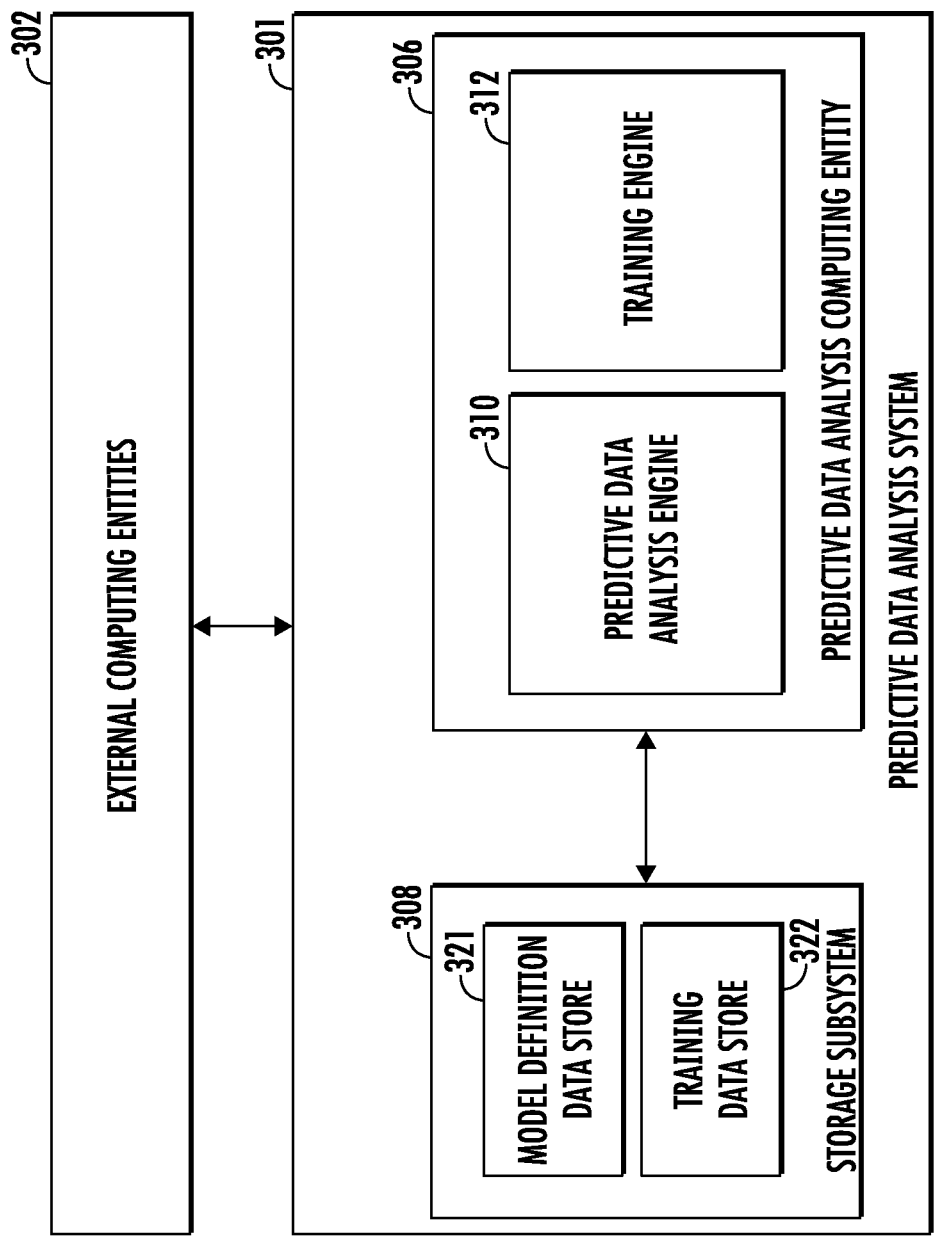
FIG. 3 provides an exemplary overview of a system that can be used to practice embodiments of the present disclosure.

FIG. 3 is a schematic diagram of an example system architecture 300 for performing data analysis operations and for performing one or more actions (e.g., causing one or more prediction-based actions to be performed one or more items). The system architecture 300 includes a predictive data analysis system 301 comprising a predictive data analysis computing entity 306 configured to generate predictive outputs that can be used to perform one or more prediction-based actions. The predictive data analysis system 301 may communicate with one or more external computing entities 302 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The system architecture 300 includes a storage subsystem 308 configured to store at least a portion of the data utilized by the predictive data analysis system 301. The predictive data analysis computing entity 306 may be in communication with one or more external computing entities 302. The predictive data analysis computing entity 306 may be configured to train a prediction model based at least in part on the training data store 322 stored in the storage subsystem 308, store trained prediction models as part of the model definition data store 321 stored in the storage subsystem 308, utilize trained models to generate predictions based at least in part on prediction inputs provided by an external computing entity 302, and perform prediction-based actions based at least in part on the generated predictions. In some embodiments, the prediction model may be a trained machine learning model. In some embodiments, the prediction model may be trained utilizing one or more reinforcement learning techniques. In some embodiments, the prediction model may trained based at least in part on the training data store 322 stored in storage subsystem 308 and by utilizing one or more steps as described in FIG. 9 and/or FIG. 11. The storage subsystem may be configured to store the model definition data store 321 for one or more predictive analysis models and the training data store 322 uses to train one or more predictive analysis models. The predictive data analysis computing entity 306 may be configured to receive requests and/or data from external computing entities 302, process the requests and/or data to generate predictive outputs and provide the predictive outputs to the external computing entities 302. The external computing entity 302 may periodically update/provide raw input data to the predictive data analysis system 301. The external computing entities 302 may further generate user interface data corresponding to the predictive outputs and may provide the user interface data corresponding with the predictive outputs for presentation to user computing entities operated by end-users.

The storage subsystem 308 may be configured to store at least a portion of the data utilized by the predictive data analysis computing entity 306 to perform predictive data analysis steps/operations and tasks. The storage subsystem 308 may be configured to store at least a portion of operational data and/or operational configuration data including operational instructions and parameters utilized by the predictive data analysis computing entity 306 to perform data analysis steps/operations in response to requests. The storage subsystem 308 may include one or more storage units, such as multiple distributed storage units that are connected through a computer network. Each storage unit in the storage subsystem 308 may store at least one of one or more data assets and/or one or more data about the computed properties of one or more data assets. Moreover, each storage unit in the storage subsystem 308 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

The predictive data analysis computing entity 306 includes a predictive data analysis engine 310 and a training engine 312. The predictive data analysis engine 310 may be configured to perform predictive data analysis upon a request from one or more external computing entities. For example, the predictive data analysis engine 310 may be configured to one or more prediction based actions based at least in part on one or more placement locations and/or removal locations. The training engine 312 may be configured to train the predictive data analysis engine 310 in accordance with the training data store 322 stored in the storage subsystem 308.

Figure 4:
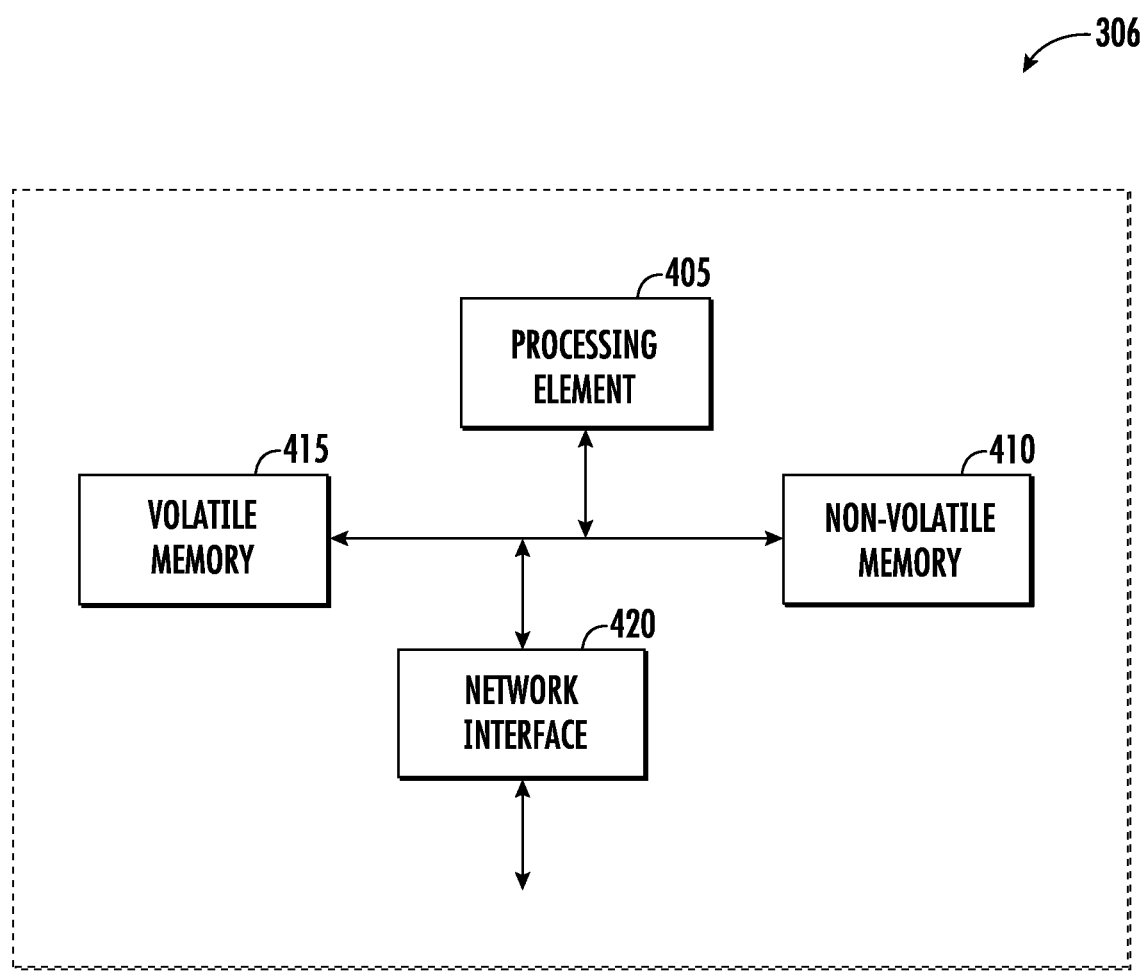
FIG. 4 provides an example predictive data analysis computing entity in accordance with some embodiments discussed herein.

FIG. 4 provides a schematic of a predictive data analysis computing entity 306 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 306 may also include a network interface 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the predictive data analysis computing entity 306 may include or be in communication with a processing element 405 (also referred to as processors, processing circuitry, and/or similar terms used herein interchangeably) that communicate with other elements within the predictive data analysis computing entity 306 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present disclosure when configured accordingly.

In one embodiment, the predictive data analysis computing entity 306 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 410, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 306 may further include or be in communication with volatile media (also referred to as volatile storage, memory, memory storage, memory circuitry and/or similar terms used herein interchangeably). In one embodiment, the volatile storage or memory may also include at least one volatile memory 415, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 306 with the assistance of the processing element 405 and operating system.

As indicated, in one embodiment, the predictive data analysis computing entity 306 may also include a network interface 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 306 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 306 may include or be in communication with one or more input elements, such as a keyboard input, a mouse input, a touch screen/display input, motion input, movement input, audio input, pointing device input, joystick input, keypad input, and/or the like. The predictive data analysis computing entity 306 may also include or be in communication with one or more output elements (not shown), such as audio output, video output, screen/display output, motion output, movement output, and/or the like.

Figure 5:
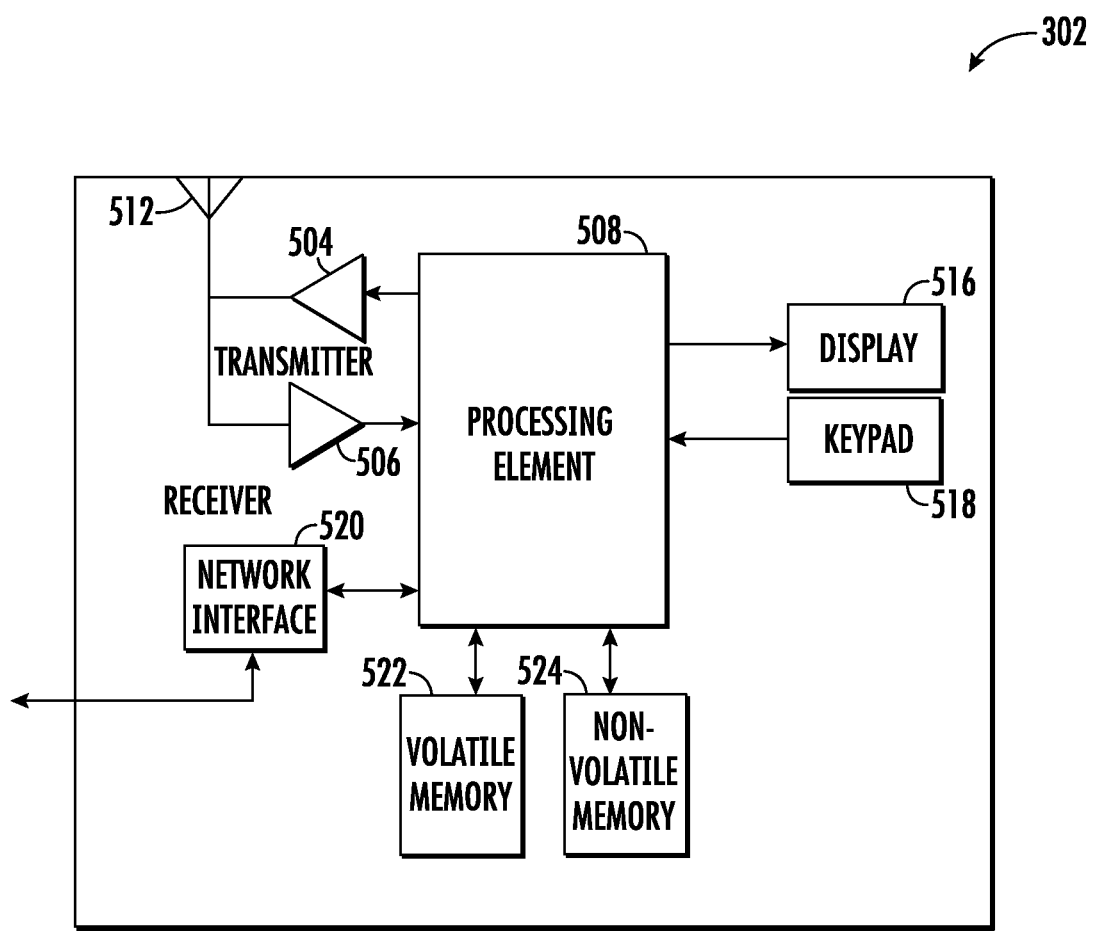
FIG. 5 provides an example external computing entity in accordance with some embodiments discussed herein.

FIG. 5 provides an illustrative schematic representative of an external computing entity 302 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 302 can be operated by various parties. As shown in FIG. 5, the external computing entity 302 can include an antenna 512, a transmitter 504 (e.g., radio), a receiver 506 (e.g., radio), and a processing element 508 (e.g., CPLDs, microprocessors, multi-core processors, coprocessing entities, ASIPs, microcontrollers, and/or controllers) that provides signals to and receives signals from the transmitter 504 and receiver 506, correspondingly.

The signals provided to and received from the transmitter 504 and the receiver 506, correspondingly, may include signaling information/data in accordance with air interface standards of applicable wireless systems. In this regard, the external computing entity 302 may be capable of operating with one or more air interface standards, communication protocols, modulation types, and access types. More particularly, the external computing entity 302 may operate in accordance with any of a number of wireless communication standards and protocols, such as those described above with regard to the predictive data analysis computing entity 306. In a particular embodiment, the external computing entity 302 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 302 may operate in accordance with multiple wired communication standards and protocols, such as those described above with regard to the predictive data analysis computing entity 306 via a network interface 520.

Via these communication standards and protocols, the external computing entity 302 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 302 can also download changes, add-ons, and updates, for instance, to its firmware, software (e.g., including executable instructions, applications, program modules), and operating system.

According to one embodiment, the external computing entity 302 may include location determining aspects, devices, modules, functionalities, and/or similar words used herein interchangeably. For example, the external computing entity 302 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 302 position in connection with a variety of other systems, including cellular towers, Wi-Fi access points, and/or the like. Similarly, the external computing entity 302 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 302 may also comprise a user interface (that can include a display 516 coupled to a processing element 508) and/or a user input interface (coupled to a processing element 508). For example, the user interface may be a user application, browser, user interface, and/or similar words used herein interchangeably executing on and/or accessible via the external computing entity 302 to interact with and/or cause display of information/data from the predictive data analysis computing entity 306, as described herein. The user input interface can comprise any of a number of devices or interfaces allowing the external computing entity 302 to receive data, such as a keypad 518 (hard or soft), a touch display, voice/speech or motion interfaces, or other input device. In embodiments including a keypad 518, the keypad 518 can include (or cause display of) the conventional numeric (0-9) and related keys (#, *), and other keys used for operating the external computing entity 302 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 302 can also include volatile storage or memory 522 and/or non-volatile storage or memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 302. As indicated, this may include a user application that is resident on the entity or accessible through a browser or other user interface for communicating with the predictive data analysis computing entity 306 and/or various other computing entities.

In another embodiment, the external computing entity 302 may include one or more components or functionality that are the same or similar to those of the predictive data analysis computing entity 306, as described in greater detail above. As will be recognized, these frameworks and descriptions are provided for exemplary purposes only and are not limiting to the various embodiments.

Figure 6:
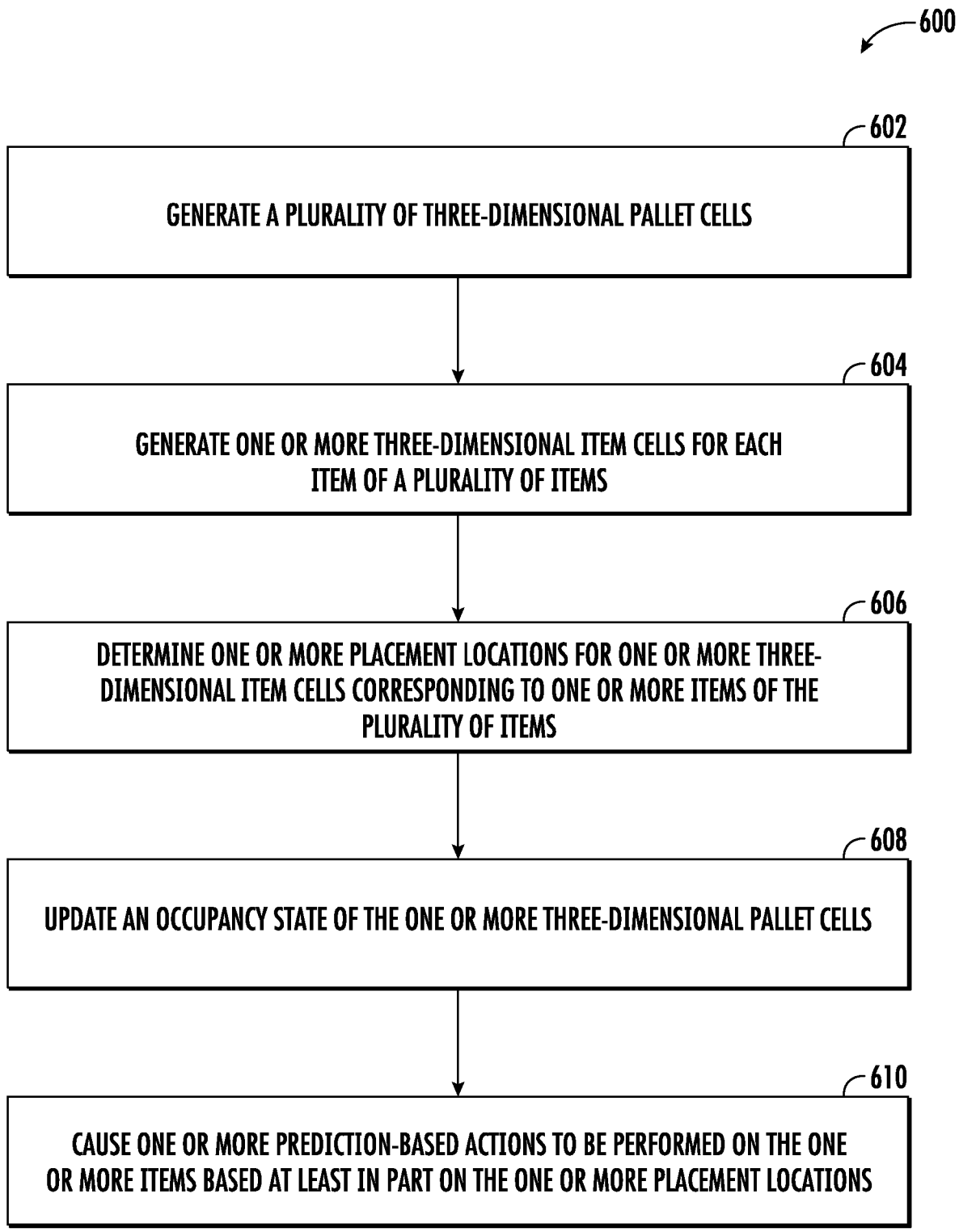
FIG. 6 is a flowchart diagram representing an example process for determining a placement location for one or more items in accordance with various embodiments of the present disclosure.

FIG. 6 is a flowchart diagram of an example process 600 for determining one or more placement locations on a pallet for one or more objects. Via the various steps/operations of the process 600, the predictive data analysis computing entity 306 can automatically determine one or more placement locations for one or more items such that pallet stability is considered during a palletization process.

The process 600 begins at step/operation 602 when the predictive data analysis engine 310 of the predictive data analysis computing entity 306 generates a plurality of three-dimensional pallet cells for a pallet having a pallet volume.

In some embodiments, the predictive data analysis engine 310 may receive a request from one or more external computing entities 302 to generate a determine one or more placement locations for a plurality of items and in response, may perform the step/operations described in FIG. 6. In some embodiments, the predictive data analysis engine may receive a pallet characteristic data object from one or more computing entities 302, which describes characteristic data of the pallet. In some embodiments, the pallet characteristic data object may describe a pallet length, a pallet width, a pallet height, pallet weight rating, and/or the like.

A pallet volume may be determined based at least in part on an associated pallet length, pallet width, and pallet height. The pallet length, pallet width, and pallet height may be based at least in part on the length dimension, width dimension, and/or height dimension of the pallet to be palletized. In some examples, pallet dimensions may be standardized such as based ISO Standard 6780:2003 Flat pallets for intercontinental materials handling—Principal dimensions and tolerances, Grocery Manufacturers Association (GMA) pallet, Australian standard pallets, and/or the like. Each of the foregoing are hereby incorporated by reference herein.

In some embodiments, the pallet height used to determine the volume of the pallet may be configured by a user. For example, a user may configure the pallet height value to 6 feet such that items on the pallet are stacked up to 6 feet high. In some embodiments, the pallet height used to determine the pallet volume may be determined automatically by the predictive data analysis engine 310. In some embodiments, the predictive data analysis engine 310 may utilize one or more trained machine learning models to determine the pallet height. The one or more trained machine learning models may be trained to determine the pallet height such that the items on the pallet remain stable, are not crushed, and/or the like. In some embodiments, the one or more trained machine learning models may be trained to determine the maximum pallet height such that the items on the pallet remain stable. In some embodiments, a maximum pallet height of a pallet may be configured such that the pallet height may not exceed the maximum pallet height. For example, the maximum pallet height of a pallet may be 15 feet. The maximum pallet height for a pallet may be determined based at least in part on one or more regulatory bodies (e.g., occupational safety and health administration (OSHA)), one or more standards bodies, one or more environmental restrictions (e.g., the maximum height of shelving available to store pallets), and/or the like. In some embodiments, the height dimension of the pallet may be included in the pallet height of the pallet such that the total pallet height of the pallet and items does not exceed the maximum pallet height.

Although a pallet will have an associated length dimension and width dimension, in some embodiments, one or more items may overhang from the sides of the pallet. As such, the value of the pallet length and/or pallet width may be greater than the value of the length dimension and/or width dimension. In some embodiments, the pallet length and pallet width of the pallet to be palletized may be configured by a user. As such, the user may control the amount of item overhang allowed. In some embodiments, the pallet length and/or width may be determined automatically by the predictive data analysis engine 310. In some embodiments, the predictive data analysis engine 310 may utilize one or more trained machine learning models to determine the pallet length and/or pallet width. The one or more trained machine learning models may be trained to determine the pallet length and/or pallet width such that the items on the pallet remain stable. In some embodiments, the one or more trained machine learning models may be trained to determine the maximum pallet length and/or pallet width such that the items on the pallet remain stable. In some embodiments, a maximum pallet length and/or maximum pallet width may be configured such that the pallet length and/or pallet width does not exceed the maximum pallet length and/or maximum pallet width. For example, the maximum pallet length and/or pallet width of a pallet may be 1.5 inches. The maximum pallet height for a pallet may be determined based at least in part on one or more regulatory bodies (e.g., occupational safety and health administration (OSHA)), one or more environmental restrictions (e.g., the maximum surface area of shelving available to store pallets), and/or the like.

The pallet volume may be segmented by a plurality of three-dimensional pallet cells each comprising a cell volume that is at least a portion of the pallet volume. Each cell volume may be associated with a cell length, a cell width, and a cell height. In some embodiments, the corresponding cell volumes for the plurality of three-dimensional pallet cells are equal. In some embodiments, the plurality of three-dimensional cells comprise a rectangular shape. Each of the three-dimensional pallet cells may correspond to a particular location on the pallet. In some embodiments, each three-dimensional pallet cell may be associated with a unique pallet cell identifier which uniquely identifies the three-dimensional pallet cell from the plurality of three-dimensional pallet cells. In some embodiments, the pallet may be labelled, such as by a barcode, QR code, or the like, such that the pallet may be oriented correctly. Additionally, the information conveyed by the barcode, QR code, or the like may allow the reader and/or one or more associated computing entities, such as one or more external computing entities 302, to recreate information regarding the pallet, such as the plurality of three-dimensional cells and the location described by each of the three-dimensional pallet cells.

In some embodiments, the predictive data analysis engine 310 of the predictive data analysis computing entity 306 may receive an item characteristic data object describing one or more characteristics for one or more items of the plurality of items. For example, the item characteristic data object may describe the length dimension, width dimension, height dimension, item radius, item volume, item weight, item shape, and/or the like for each of the one or more items of the plurality of items. In some embodiments, the item characteristic data object may be generated by the predictive data analysis engine 310 or by one or more external computing entities 302. In some embodiments, the item characteristic data for the one or more items may be determined using one or more sensors, systems, and/or other analysis tools. For example, an item may be scanned by a vision system to determine one or more item dimensions and/or an item shape. As another example, an item may be weighed by an item scale to determine the item weight. The item characteristic data object may be generated to describe the item characteristic data for each item. In some embodiments, the predictive data analysis engine 310 or one or more external computing entities 302 may determine an item volume for each item based at least in part on the item characteristic data associated with the item.

In some embodiments, the cell volume for the plurality of three-dimensional pallet cells may be based at least in part on the item characteristic data object. In some embodiments, the cell volume of the plurality of three-dimensional pallet cells is based at least in part on the item described by the item characteristic data object associated with the smallest item volume and/or item dimensions. For example, the cell volume for the plurality of three-dimensional pallet cells may be equivalent to the smallest item volume.

Each three-dimensional pallet cell may be associated with an occupancy state. The occupancy state may be indicative of whether a three-dimensional pallet cell is occupied by an item. In some embodiments, the occupancy state is a binary value. For example, an occupancy state value of 0 may indicate the three-dimensional pallet cell is unoccupied while an occupancy state value of 1 may indicate the three-dimensional pallet cell is occupied.

Figure 7:
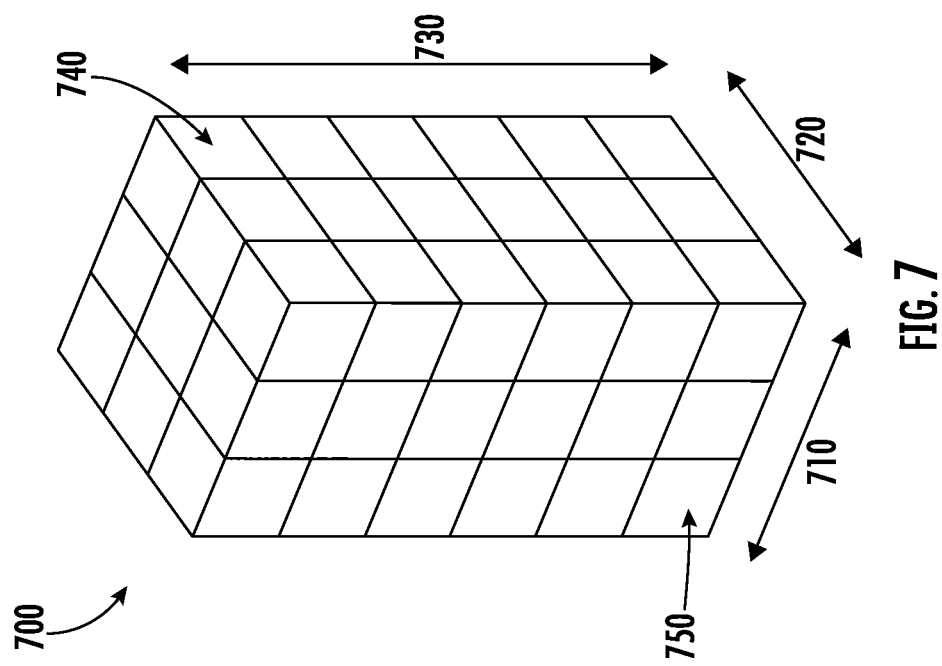
FIG. 7 is an operational example of a plurality of three-dimensional pallet cells for a pallet in accordance with various embodiments of the present disclosure.

An operational example of a plurality of three-dimensional pallet cells is depicted in FIG. 7. A pallet 700 is defined by pallet volume based at least in part on a pallet length 710, a pallet width 720, and a pallet height 730. From the pallet volume, a plurality of three-dimensional pallet cells is generated. The plurality of three-dimensional pallet cells segments the pallet 700. Each three-dimensional pallet cell 740 and 750 is associated with a cell volume defined by a cell length, a cell width, and a cell height. Further, each three-dimensional pallet cell is associated with a particular location on the pallet.

At step/operation 604, the predictive data analysis engine 310 of the predictive data analysis computing entity 306 generates one or more of three-dimensional item cells for each item of the plurality of items each having an item volume. An item volume may be determined based at least in part on one or more associated item lengths, one or more item widths, one or more associated item heights, an item radius, and/or the like. In some embodiments, one or more items of the plurality of items is a different item type than the plurality of items. In some embodiments, the predictive data analysis engine 310 may receive an item characteristic data object describing one or more item characteristics for one or more items of the plurality of items as described above with respect to step/operation 602. As such, each item may have a different item volume. Furthermore, one or more items may have an irregular and/or non-rectangular shape such that the one or more items may have more than one associated length, width, height, radius, etc. Regardless of the shape of the item, the predictive data analysis engine 310 may determine an item volume for each of the one or more items and one or more three-dimensional item cells comprising the item volume.

In some embodiments, the item volume for one or more items may be segmented by a plurality of three-dimensional item cells each comprising an item cell volume that is at least a portion of the item volume. Each item cell volume may be associated with an item cell length, an item cell width, and an item cell height. In some embodiments, the item cell volumes for the one or more three-dimensional items cells for each item are equal. In some embodiments, the item cell volumes for the one or more three-dimensional items cells are equivalent to the cell volumes of the one or more three-dimensional pallet cells. Each of the three-dimensional item cells may correspond to a particular location on the item. In some embodiments, each three-dimensional item cell may be associated with a unique item cell identifier which uniquely identifies the three-dimensional item cell from the one or more three-dimensional item cells of the same item and of the one or more three-dimensional item cells of different items. Although the item may be rotated and/or oriented differently, the one or more three-dimensional item cells will correspond to a particular location on the item such that a particular location on the item may be identified after rotation or movement. In some embodiments, the one or more three-dimensional item cells may correspond to a particular item identifier such that the corresponding item may be uniquely identified from the plurality of items.

Figure 8:
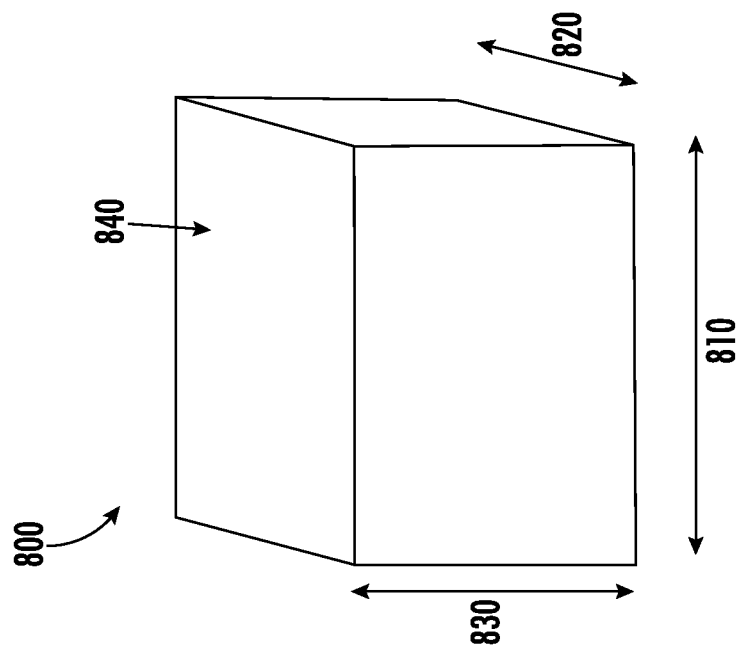
FIG. 8 is an operational example of a one or more three-dimensional item cells for an item in accordance with various embodiments of the present disclosure.

An operational example of one or more three-dimensional item cells of an item is depicted in FIG. 8. An item 800 is defined by an item volume based at least in part on an item length 810, an item width 820, and an item height 830. From the item volume, one or more three-dimensional item cells are generated. An item cell volume of a three-dimensional item cell 840 may be equivalent to the cell volume of a three-dimensional pallet cell (e.g. three-dimensional pallet cell 740 and 750 depicted in FIG. 7). Further, each three-dimensional item cell may be associated with a particular location on the item and may correspond to a particular item identifier such that the corresponding item may be uniquely identified from the plurality of items.

At step/operation 606, the predictive data analysis engine 310 of the predictive data analysis computing entity 306 determines one or more placement locations each comprising one or more three-dimensional pallet cells for one or more three-dimensional item cells corresponding to one or more items of the plurality of items. In some embodiments, the predictive data analysis engine 310 may utilize a trained machine learning model to determine the one or more placement locations. In some embodiments, the trained machine learning model may be trained to select the one or more placement locations for the three-dimensional item cells corresponding to one or more items based at least in part on stability of the one or more three-dimensional item cells on the pallet and the overall occupied volume of the pallet. In some embodiments, the trained machine learning model may be trained to select the one or more placement locations for the three-dimensional item cells based at least in part on a location score associated with each placement location, as will be discussed in greater detail in FIG. 9. In some embodiments, the location score for a particular placement location may indicative of favorable a placement location is for a particular item. For example, a placement location associated with a high location score may be indicative of a favorable location while a placement location associated with a low location score may be indicative of an unfavorable location. In some embodiments, the trained machine learning model may be trained based at least in part using reinforcement learning techniques.

In some embodiments, the location score may also correspond to a particular pallet configuration once one or more placement locations have been determined for one or more items. Similarly, the location score corresponding to a particular pallet location may be indicative of how favorable a particular pallet configuration is. In some embodiments, the location score may be the summation of each individual location score corresponding to each placement location. As such, the predictive data analysis engine 310 may determine select the one pallet configuration associated with the highest location score and determine the one or more placement locations based at least in part on the particular pallet configuration.

In some embodiments, once a placement location is determined for one or more three-dimensional item cells corresponding to one or more items, other three-dimensional item cells corresponding to one or more items may no longer be placed within the three-dimensional pallet cells comprising the placement location. As will be discussed in more detail in step/operation 608, the three-dimensional pallet cells which comprise a placement location may be occupied such that the three-dimensional pallet cells are no longer available for placement of other items. The three-dimensional pallet cells corresponding to the placement location may be associated with an occupied occupancy state. Additionally, once one or more placement locations for one or more three-dimensional item cells corresponding to one or more items have been determined, the number of available three-dimensional pallet cells may decrease, thereby also decreasing the overall computational complexity and required processing time to determine the one or more placement locations for the remaining one or more three-dimensional item cells corresponding to one or more items of the plurality of items.

In some embodiments, a placement location for an item may be associated with a placement identifier indicative of when an item is to be placed during palletization. Each placement location for the plurality of items may be associated with a placement identifier such that the sequence of items placed during palletization may be determined. For example, the first determined placement location may be associated with a placement identifier describing a value of 1 and a value of item ABC while a second determined placement location may be associated with a placement identifier describing a value of 2 a value of item XYZ. This may be indicative that item ABC is placed in a corresponding placement location first and then item XYZ is placed in a corresponding placement location next.

The one or more placement locations comprising the one or more three-dimensional pallet cells contains one or more three-dimensional item cells corresponding to one or more items placed within the one or more three-dimensional pallet cells. Further, each of the one or more placement locations comprising one or more three-dimensional pallet cells corresponds to a particular location on the pallet. For example, with reference back to FIG. 7, the three-dimensional pallet cell 750 may correspond to the bottom-most three-dimensional pallet cell in the upper left hand corner on the pallet while the three-dimensional pallet cell 750 may correspond to the uppermost three-dimensional pallet cell in the lower right hand corner on the pallet. As another example, an item 800 from FIG. 8 comprising one three-dimensional item cell 840 may have the same item cell volume as the cell volumes associated with three-dimensional pallet cell 740 and 750. The item 800 may be placed in either three-dimensional pallet cell 740 or 750. As such, the three-dimensional pallet cell 740 or 750 may be contain the three-dimensional item cell 840 corresponding to the item 800.

In some embodiments, step/operation 606 may also be performed in accordance with the various steps/operations of the process 900 that is depicted in FIG. 9, which is a flowchart diagram of an example process for determining a location score a placement location of an item.

The process 900 begins at step/operation 902, when the predictive data analysis engine 310 of the predictive data analysis computing entity 306 assigns a placement location for one or more three-dimensional item cells corresponding to an item. In some embodiments, the predictive data analysis engine 310 may utilize a trained machine learning model to assign a placement location for the one or more three-dimensional item cells corresponding to the item. The trained machine learning model may initially select one or more three-dimensional pallet cells to place the one or more three-dimensional item cells corresponding to the item. In some embodiments, the trained machine learning model may be trained to select certain three-dimensional pallet cells over others. For example, the trained machine learning model may select three-dimensional pallet cells which correspond to a location closest to the bottom of the pallet.

In some embodiments, the trained machine learning model may also be configured to initially select one or more three-dimensional item cells corresponding to one or more items of the plurality of items before other items. For example, the trained machine learning model may be configured to select one or more three-dimensional item cells corresponding to items associated with the largest item volume before selection of one or more three-dimensional item cells corresponding to items associated with smaller item volumes. As another example, the trained machine learning model may be configured to select one or more three-dimensional item cells corresponding to items associated with the largest item weight before selection of one or more three-dimensional item cells corresponding to items associated with smaller item weights. As yet another example, the trained machine learning model may be configured to select one or more three-dimensional item cells corresponding to items associated with non-rectangular shapes after selection of one or more three-dimensional item cells corresponding to items with rectangular shapes. In this way, items with non-rectangular shapes may be placed after items of rectangular shapes such that the items with rectangular shapes may assist in stabilizing items of non-rectangular shapes. The predictive data analysis engine 310 may receive an item characteristic data object for one or more items of the plurality of items which describes one or more item characteristics for each item of the plurality of items as previously described with respect to step/operation 602 in FIG. 6. The item characteristic data object for the one or more items may be used by the predictive data analysis engine 310 to determine the item characteristic data for each item during item selection.

At step/operation 904, the predictive data analysis engine 310 of the predictive data analysis computing entity 306 determines a location score for placement location for the one or more three-dimensional item cells corresponding to item. In some embodiments, the predictive data analysis engine 310 may utilize a trained machine learning model to determine the location score for a placement location. In some embodiments, the plurality of three-dimensional pallet cells may start with an initial location score. When the one or more three-dimensional item cells corresponding to an item is placed in a placement location, the trained machine learning model may update the location score based at least in part on the placement location. In some embodiments, the location score may be based at least in part on the occupancy state of one or more three-dimensional pallet cells adjacent to the three-dimensional pallet cells comprising the placement location and an overall volume occupancy of the pallet. The overall volume occupancy may be determined based at least in part on the number of three-dimensional pallet cells with an occupied occupancy state. Ins some embodiments, a location score may be increased when an item is placed in placement location associated with high occupancy of adjacent three-dimensional pallet cells and/or when the unoccupied space comprising the pallet volume is decreased. In some embodiments, a location score may be decreased when an item is placed in placement location associated with low occupancy of adjacent three-dimensional pallet cells or if a placement location is determined to be invalid and/or when unoccupied three-dimensional pallet cells are blocked off such that they may no longer be used. A placement location may be determined to be invalid if three-dimensional pallet cells comprising the placement location lack any adjacent three-dimensional pallet cells with occupied states. For example, a placement location with 100% occupied adjacent three-dimensional pallet cells below the three-dimensional pallet cells comprising the placement location and 50% occupied adjacent three-dimensional pallet cells on two sides of the three-dimensional pallet cells may be associated with a higher location score than a placement location with 100% occupied adjacent three-dimensional pallet cells below the three-dimensional pallet cells comprising the placement location and 0% occupied adjacent three-dimensional pallet cells any side of the three-dimensional pallet cells. In this way, the trained machine learning model may ensure the items placed on the pallet are stable while also ensuring the pallet volume is efficiently used.

The processes described in step/operations 902 and 904 may be performed iteratively for one or more other placement locations for the same item and the placement location associated with the highest location score may be selected as the placement location for the item. In some embodiments, the trained machine learning model may be performed step/operations 902 and 904 for one or more pallet configurations and select the pallet configuration which results in the highest location score.

At step/operation 608, the predictive data analysis engine 310 of the predictive data analysis computing entity 306 updates an occupancy state of the one or more three-dimensional pallet cells. The predictive data analysis engine 310 may update the occupancy state of the one or more three-dimensional pallet cells based at least in part on the one or more placement locations determined for the one or more three-dimensional item cells corresponding to item. The occupancy state of the one or more three-dimensional pallet cells may be updated to indicate the three-dimensional pallet cells are now occupied. For example, the one or more three-dimensional pallet cells associated with the placement location may be updated from an occupancy state value of 0, indicating the three-dimensional pallet cells are unoccupied to an occupancy state value of 1, indicating the three-dimensional pallet cells are occupied. In this way, one or more three-dimensional item cells corresponding to other items may be prevented from being placed in the same location corresponding to the occupied three-dimensional pallet cells. Further, the updated occupancy state of the one or more three-dimensional pallets cells may indicate an updated pallet configuration and allow for one or more one or more three-dimensional item cells corresponding to one or more other items to be placed on adjacent three-dimensional pallets cells.

At step/operation 610, the predictive data analysis engine 310 of the predictive data analysis computing entity 306 causes one or more prediction-based actions to be performed on the one or more items based at least in part on the one or more placement locations. In some embodiments, the one or more prediction-based actions comprise causing one or more indications to be provided (e.g., sent, transmitted, etc.) to one or more associated computing devices, such as one or more external computing entities 302. In some embodiments, the one or more indications may trigger the one or more computing devices to place the one or more items on the pallet based at least in part on the determined placement location for the one or more items on the pallet. This may be accomplished in any variety of ways, such as by using one or more robotic arms.

In some embodiments, the one or more computing entities control the one or more robotic arms. In some embodiments, the one or more computing entities may execute one or more programming instructions, causing the one or more robotic arms to perform one or more motions, actions, and/or functions. For example, the one or more programming instructions may cause the one or more robotic arms to grip, pick-up, move, convey, transport, release, place, flip, and/or otherwise manipulate an item. In some embodiments, each robotic arm may be associated with a robotic device identifier that may uniquely identify the robotic arm. In some embodiments, the one or more computing entities may use this robotic device identifier to identify each of the one or more robotic arms. In some embodiments, the one or more robotic arms may be controlled such that they pick one or more items and move the one or more items onto a pallet. The one or more robotic arms may be any suitable type of robotic arm such as an articulated, cartesian, cylindrical, polar, SCARA, and/or a Delta robotic arm.

The one or more computing entities may palletize a pallet by placing each item in the corresponding placement location as determined by the predictive data analysis engine 310. In some embodiments, the predictive data analysis engine 310 may provide an indication to the one or more computing entities each time a placement location for an item is determined. In some embodiments, the predictive data analysis engine 310 may provide an indication to the one or more computing entities once a placement location for each item of the plurality of items is determined and the one or more computing entities may utilize the placement identifier indicative of the sequence of palletization for the one or more placement locations.

In some embodiments, the one or more prediction-based actions comprise causing one or more indications to be provided (e.g., sent, transmitted, etc.) to one or more associated computing devices, such as one or more external computing entities 302. In some embodiments, the one or more indications may trigger the one or more computing devices to display a particular pallet configuration comprising the plurality of three-dimensional pallet cells and one or more three-dimensional item cells corresponding to one or more items. For example, a predictive data analysis engine 310 may cause one or more indications to be provided to one or more external computing entities 302. This may cause the one or more external computing entities 302 to display a particular pallet configuration to one or more end users, such as via, display 516. In some embodiments, the predictive data analysis engine 310 may provide an indication to the one or more computing entities each time a placement location for an item is determined. As such, the pallet configuration may be displayed to one or more end users as the one or more placement locations corresponding to each of the one or more items is determined. In some embodiments, the predictive data analysis engine 310 may provide an indication to the one or more computing entities once a placement location for each item of the plurality of items is determined.

After the palletization process is executed using the process described in FIG. 6, a pallet may be depalletized. Typically, pallets are depalletized once the pallet is delivered to a particular destination. In some embodiments, a pallet may be configured with a barcode, QR code, and/or the like indicate how the pallet was palletized such that the pallet may then be depalletized. For example, the barcode, QR code, or the like may indicate each placement identifier associated with the pallet indicative of the sequence of the items were placed onto the pallet. In some embodiments, the one or more computing entities may automatically determine a removal sequence for the one or more items on a pallet based at least in part on the one or more placement identifiers associated with the pallet. For example, the one or more computing entities may reverse the placement sequence described by the one or more placement identifiers to depalletize the pallet.

However, in some embodiments, it may be advantageous to automatically determine one or more removal locations for the depalletization process. For example, a removal sequence determined automatically by the predictive data analysis computing entity 306 may result in a faster depalletization time as compared to a removal sequence determined by reversing the placement sequence.

Figure 10:
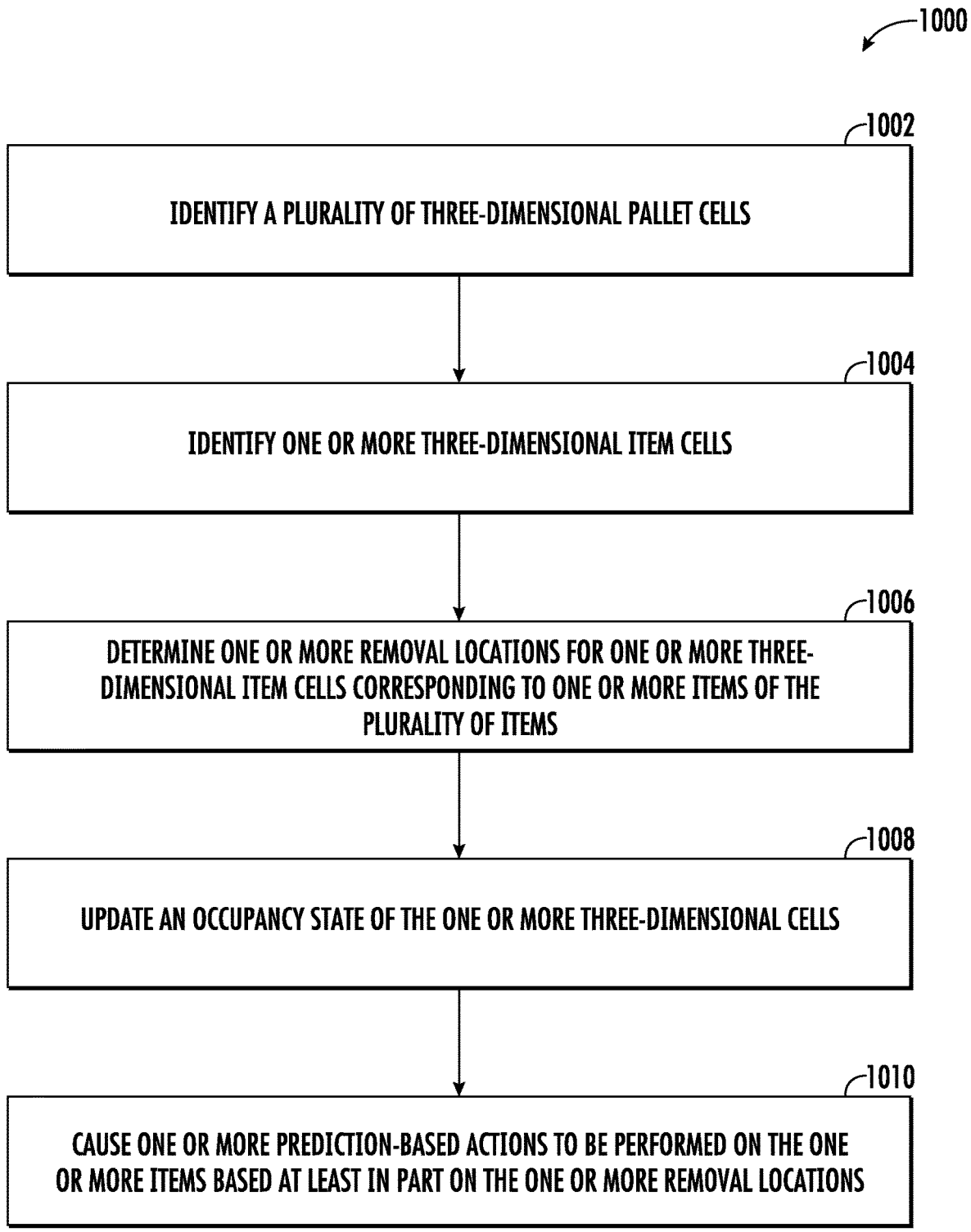
FIG. 10 is a flowchart diagram representing an example process for determining a removal location for one or more items in accordance with various embodiments of the present disclosure.

FIG. 10 is a flowchart diagram of an example process 1000 for determining one or more removal locations on a pallet for one or more objects. Via the various steps/operations of the process 1000, the predictive data analysis computing entity 306 can automatically determine one or more removal locations for one or more items such that pallet stability is considered.

The process 1000 begins at step/operation 1002 when the predictive data analysis engine 310 of the predictive data analysis computing entity 306 identifies a plurality of three-dimensional pallet cells. The predictive data analysis engine 310 may identify the plurality of three-dimensional pallet cells in any variety of ways. For example, a pallet may be configured with a barcode, QR code, and/or the like indicate of the three-dimensional pallet cells for the pallet. Furthermore, the barcode, QR code, and/or the like may indicate the orientation of the pallet.

At step/operation 1004, the predictive data analysis engine 310 of the predictive data analysis computing entity 306 identifies one or more three-dimensional item cells for each item in a pallet. Similar to the above, the predictive data analysis engine 310 may identify the plurality of three-dimensional item cells in any variety of ways. For example, a pallet may be configured with a barcode, QR code, and/or the like indicate of the one or more three-dimensional item cells for each item in the pallet.

At step/operation 1006, the predictive data analysis engine 310 of the predictive data analysis computing entity 306 determines one or more removal locations each comprising one or more three-dimensional pallet cells for one or more three-dimensional cells corresponding to one or more items of the plurality of items. In some embodiments, the predictive data analysis engine 310 may utilize a trained machine learning model to determine the one or more removal locations. In some embodiments, the trained machine learning model may be trained to select the one or more removal locations for the one or more three-dimensional cells corresponding to one or more items based at least in part on stability of the one or more items on the pallet. In some embodiments, the trained machine learning model may be trained to select the one or more removal locations for the three-dimensional item cells based at least in part on a location score associated with each removal location, as will be discussed in greater detail in FIG. 11. In some embodiments, the location score for a particular removal location may indicative of favorable a removal location is for a particular item. For example, a removal location associated with a high location score may be indicative of a favorable location while a removal location associated with a low location score may be indicative of an unfavorable location. In some embodiments, the trained machine learning model may be trained based at least in part using reinforcement learning techniques.

In some embodiments, the location score may also correspond to a particular pallet configuration once one or more removal locations have been determined for one or more items. Similarly, the removal score corresponding to a particular pallet location may be indicative of how favorable a particular pallet configuration is. In some embodiments, the location score may be the summation of each individual location score corresponding to each removal location. As such, the predictive data analysis engine 310 may determine select the one pallet configuration associated with the highest location score and determine the one or more removal locations based at least in part on the particular pallet configuration.

In some embodiments, a removal location for an item may be associated with a removal identifier indicative of when an item is to be removed during depalletization. Each removal location for the plurality of items may be associated with a removal identifier such that the sequence of items removed during depalletization may be determined. For example, the first determined removal location may be associated with a removal identifier describing a value of 1 and a value of item XYZ while a second determined removal location may be associated with a removal identifier describing a value of 2 and a value of item ABC. This may be indicative that item XYZ is removed from a corresponding removal location first and then item ABC is removed from a corresponding removal location next.

The one or more removal locations comprising the one or more three-dimensional pallet cells contains one or more three-dimensional item cells corresponding to one or more items removed from the one or more three-dimensional pallet cells. Further, each of the one or more removal locations comprising one or more three-dimensional pallet cells corresponds to a particular location on the pallet, similar to that described in FIG. 6

Figure 11:
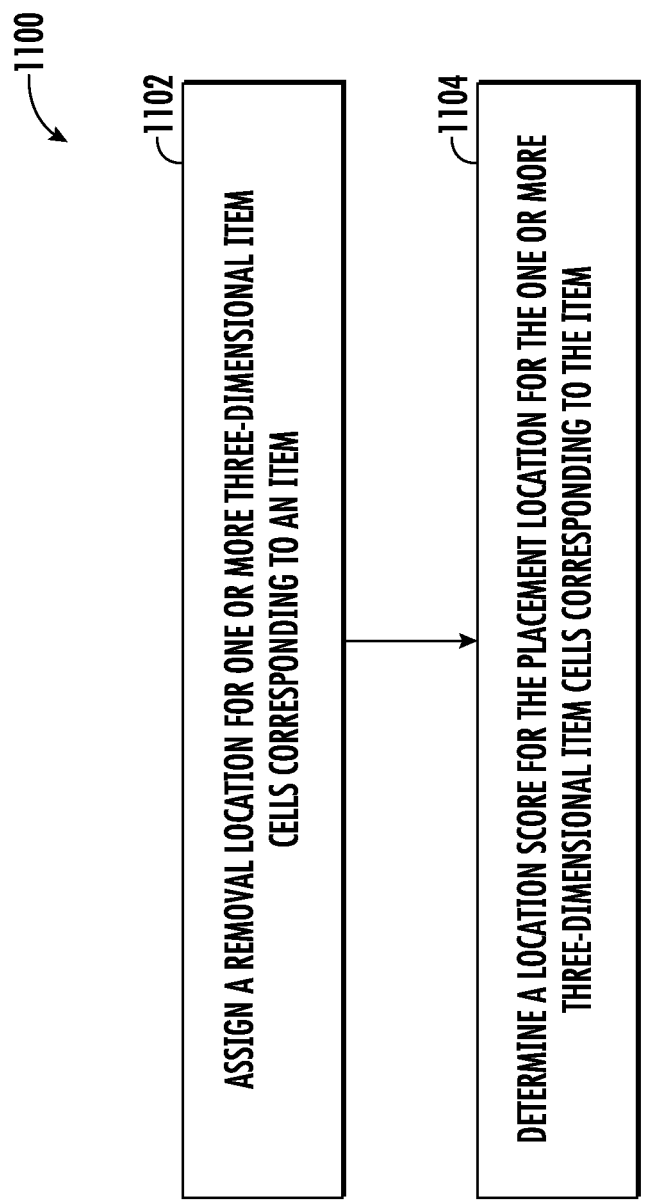
FIG. 11 is a flowchart diagram representing an example process for determining a location score for a removal location of an item in accordance with various embodiments of the present disclosure.

In some embodiments, step/operation 1006 may also be performed in accordance with the various steps/operations of the process 1100 that is depicted in FIG. 11, which is a flowchart diagram of an example process for determining a location score a removal location of an item.

The process 1100 begins at step/operation 1102, when the predictive data analysis engine 310 of the predictive data analysis computing entity 306 assigns a removal location for one or more three-dimensional item cells corresponding to an item. In some embodiments, the predictive data analysis engine 310 may utilize a trained machine learning model to assign a removal location for the one or more three-dimensional item cells corresponding to the item. The trained machine learning model may initially select one or more three-dimensional pallet cells to remove the one or more three-dimensional item cells corresponding to the item from. In some embodiments, the trained machine learning model may be trained to select certain three-dimensional pallet cells over others. For example, the trained machine learning model may select three-dimensional pallet cells which correspond to a location closest to the top of the pallet.

In some embodiments, the trained machine learning model may also be configured to initially select one or more three-dimensional item cells corresponding to one or more items of the plurality of items before other items. For example, the trained machine learning model may be configured to select one or more three-dimensional item cells corresponding to items associated with the smallest item volume before selection of one or more three-dimensional item cells corresponding to items associated with larger item volumes. As another example, the trained machine learning model may be configured to select one or more three-dimensional item cells corresponding to items associated with the smallest item weight before selection of one or more three-dimensional item cells corresponding to items associated with larger item weights. As yet another example, the trained machine learning model may be configured to select one or more three-dimensional item cells corresponding to items associated with non-rectangular shapes before selection of one or more three-dimensional item cells corresponding to items with rectangular shapes. In this way, items with non-rectangular shapes may be removed before items with rectangular shapes such that the items with non-rectangular shapes are not prone to de-stabilize. The predictive data analysis engine 310 may receive an item characteristic data object for one or more items of the plurality of items which describes one or more item characteristics for each item of the plurality of items as previously described with respect to step/operation 602 in FIG. 6. The item characteristic data object for the one or more items may be used by the predictive data analysis engine 310 to determine the item characteristic data for each item during item selection.

At step/operation 1104, the predictive data analysis engine 310 of the predictive data analysis computing entity 306 determines a location score for a removal location for the one or more three-dimensional item cells corresponding to item. In some embodiments, the predictive data analysis engine 310 may utilize a trained machine learning model to determine the location score for a removal location. In some embodiments, the plurality of three-dimensional pallet cells may start with an initial location score. When the one or more three-dimensional item cells corresponding to an item is removed from a removal location, the trained machine learning model may update the location score based at least in part on the removal location. In some embodiments, the location score may be based at least in part on the occupancy state of one or more three-dimensional pallet cells adjacent to the three-dimensional pallet cells comprising the removal location. For example, a location score may be increased when an item is removed from a removal location associated with low occupancy of adjacent three-dimensional pallet cells. As another example, a location score may be decreased when an item is removed from a removal location associated with high occupancy of adjacent three-dimensional pallet cells or if a removal location is determined to be invalid. A removal location may be determined to be invalid if three-dimensional pallet cells comprising the removal location have any adjacent three-dimensional pallet cells comprising occupied occupancy states above the three-dimensional pallet cells comprising the removal location. In this way, the trained machine learning model may ensure the items are removed from the pallet such that the other items on the pallet remain stable.

The processes described in step/operations 1102 and 1104 may performed iteratively for one or more other removal locations for the same item and the removal location associated with the highest location score may be selected as the removal location for the item. In some embodiments, the trained machine learning model may be performed step/operations 1102 and 1104 for one or more pallet configurations and select the pallet configuration which results in the highest location score.

At step/operation 1008, the predictive data analysis engine 310 of the predictive data analysis computing entity 306 updates an occupancy state of the one or more three-dimensional pallet cells. The predictive data analysis engine 310 may update the occupancy state of the one or more three-dimensional pallet cells based at least in part on the one or more removal locations determined for the one or more three-dimensional item cells corresponding to item. The occupancy state of the one or more three-dimensional pallet cells may be updated to indicate the three-dimensional pallet cells are now unoccupied. For example, the one or more three-dimensional pallet cells associated with the removal location may be updated from an occupancy state value of 1, indicating the three-dimensional pallet cells are occupied to an occupancy state value of 0, indicating the three-dimensional pallet cells are unoccupied. The updated occupancy state of the one or more three-dimensional pallets cells may indicate an updated pallet configuration.

At step/operation 1010, the predictive data analysis engine 310 of the predictive data analysis computing entity 306 causes one or more prediction-based actions to be performed on the one or more items based at least in part on the one or more removal locations. In some embodiments, the one or more prediction-based actions comprise causing one or more indications to be provided (e.g., sent, transmitted, etc.) to one or more associated computing devices, such as one or more external computing entities 302. In some embodiments, the one or more indications may trigger the one or more computing devices to remove the one or more items on the pallet based at least in part on the determined removal location for the one or more items on the pallet. This may be accomplished in any variety of ways, such as by using one or more robotic arms.

In some embodiments, the one or more computing entities control the one or more robotic arms. The computing entities may control the one or more robotic arms during the depalletization process in a similar manner as described for the palletization process described with respect to step/operation 608 in FIG. 6.

The one or more computing entities may depalletize a pallet by removing each item in the corresponding removal location as determined by the predictive data analysis engine 310. In some embodiments, the predictive data analysis engine 310 may provide an indication to the one or more computing entities each time a removal location for an item is determined. In some embodiments, the predictive data analysis engine 310 may provide an indication to the one or more computing entities once a removal location for each item of the plurality of items is determined and the one or more computing entities may utilize the removal identifier indicative of the sequence of depalletization for the one or more removal locations.

In some embodiments, the one or more prediction-based actions comprise causing one or more indications to be provided (e.g., sent, transmitted, etc.) to one or more associated computing devices, such as one or more external computing entities 302. In some embodiments, the one or more indications may trigger the one or more computing devices to display a particular pallet configuration comprising the plurality of three-dimensional pallet cells and one or more three-dimensional item cells corresponding to one or more items. For example, a predictive data analysis engine 310 may cause one or more indications to be provided to one or more external computing entities 302. This may cause the one or more external computing entities 302 to display a particular pallet configuration to one or more end users, such as via, display 516. In some embodiments, the predictive data analysis engine 310 may provide an indication to the one or more computing entities each time a removal location for an item is determined. As such, the pallet configuration may be displayed to one or more end users as the one or more removal locations corresponding to each of the one or more items is determined. In some embodiments, the predictive data analysis engine 310 may provide an indication to the one or more computing entities once a removal location for each item of the plurality of items is determined.

FIG. 12 is a flowchart diagram of an example process 1200 for determining a portion of the cell volume that is occupied for each three-dimensional pallet cell associated with an occupied occupancy state. Via the various steps/ operations of the process 1200, the predictive data analysis computing entity 306 can automatically determine whether the entirety of each three-dimensional pallet cell is occupied. As such items with non-rectangular shapes may be accounted for.

The process 1200 begins at step/operation 1202 when the predictive data analysis engine 310 of the predictive data analysis computing entity 306 receives an item characteristic data object for one or more items of the plurality of items. The item characteristic data object may describe one or more item characteristics for each item of the plurality of items. For example, the item characteristic data object may describe the length dimension, width dimension, height dimension, item radius, item volume, item weight, item shape, and/or the like. In some embodiments, the one or more three-dimensional item cells for each item may be based at least in part on the item characteristic data object.

At step/operation 1204, the predictive data analysis engine 310 of the predictive data analysis computing entity 306 determines a portion of the cell volume that is occupied for each three-dimensional pallet cell associated with an occupied occupancy state. The predictive data analysis engine 310 may determine the portion of the cell volume that is occupied for each three-dimensional pallet cell associated with an occupied occupancy state based at least in part on the item characteristic data object for the one or more items and the determined one or more placement locations for the one or more items. For example, a placement location for an item may comprise two three-dimensional pallet cells and the three-dimensional pallet cells may contain the three-dimensional item cells corresponding to the item. The item may fully occupy a first three-dimensional pallet cell but only occupy half of a second three-dimensional pallet cell. However, the occupancy state associated with the second three-dimensional pallet cell may indicate an occupied three-dimensional pallet cell although only half the three-dimensional pallet cell is occupied. Additionally or alternatively, the predictive data analysis engine 310 may determine the portion of the cell volume that is occupied for each three-dimensional pallet cell associated with an occupied occupancy state based at least in part on the item characteristic data object for the one or more items and the determined one or more removal locations for the one or more items.

As such, the predictive data analysis engine 310 may determine a portion of the cell volume that is occupied for each three-dimensional pallet cell associated with an occupied occupancy state. In some embodiments, the portion of the cell volume that is occupied may be based at least in part on the one or more three-dimensional item cells for each item, which may be based at least in part on the item characteristic data object.

In some embodiments, once the predictive data analysis engine 310 determines a portion of the cell volume that is occupied for each three-dimensional pallet cell associated with an occupied occupancy state, the predictive data analysis engine 310 may segment one or more of the three-dimensional pallet cells associated with an occupied occupancy state. In some embodiments, the predictive data analysis engine 310 may segment one or more of the three-dimensional pallet cells such that at least the majority of portion of the three-dimensional pallet cell corresponding to the portion of the occupied cell volume is segmented from the majority of portion of the three-dimensional pallet cell corresponding to the portion of the unoccupied cell volume. In some embodiments, the three-dimensional pallet cells may still maintain a rectangular shape after segmentation. As such, a three-dimensional pallet cell may be segmented into two or more three-dimensional pallet cells associated with smaller cell volumes as compared to the original three-dimensional pallet cell. The predictive data analysis engine 310 may then update the occupancy state of the two or more three-dimensional pallet cells associated with an unoccupied cell volume such that the occupancy state is indicative of an unoccupied three-dimensional pallet cell.

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

That which is claimed:

1. A computer-implemented method for determining one or more placement locations on a pallet for one or more items of a plurality of items, the computer-implemented method comprising:
   generating, using one or more processors, a plurality of three-dimensional pallet cells for the pallet having a pallet volume, wherein the plurality of three-dimensional pallet cells is arranged to segment said pallet volume such that each three-dimensional cell is associated with a cell volume that is at least a portion of the pallet volume;
   generating, using the one or more processors, one or more three-dimensional item cells for each item of the plurality of items, wherein each item has a corresponding item volume, and wherein the one or more three-dimensional item cells for each item contain the corresponding item volume;
   training, using the one or more processors, a predictive machine learning model to select from the one or more placement locations each comprising one or more three-dimensional pallet cells for the one or more three-dimensional item cells corresponding to each item by utilizing at least one location score for at least one placement location for the one or more three-dimensional item cells, wherein the at least one location score is determined based on overall volume occupancy data of the pallet, wherein the overall volume occupancy data is determined based on a number of three-dimensional pallet cells that are associated with an occupied state, and wherein the at least one location score is increased when one of the plurality of items is placed in a placement location associated with a high occupancy of an adjacent three-dimensional item cell; and
   causing, using the one or more processors, one or more prediction-based actions to be performed by a robotic arm on the one or more items based at least in part on the one or more placement locations.

2. The computer-implemented method of claim 1 further comprising:
   updating, using the one or more processors, an occupancy state associated with each of the one or more three-dimensional pallet cells based at least in part on the one or more placement locations determined for the one or more three-dimensional pallet cells corresponding to the one or more items.

3. The computer-implemented method of claim 2, wherein updating the occupancy state of the one or more three-dimensional pallet cells further comprises:
receiving, from one or more computing devices, an item characteristic data object for the one or more items of the plurality of items, wherein the item characteristic data object describes one or more item characteristics pertaining to the one or more items; and
determining, using the one or more processors, a portion of the cell volume that is occupied for each three-dimensional cell associated with the occupied state based at least in part on the item characteristic data object for the one or more items and the one or more placement locations for the one or more items.

4. The computer-implemented method of claim 1, wherein the predictive machine learning model is trained using reinforcement learning techniques; and selecting the one or more placement locations further comprises:
assigning a corresponding placement location comprising the one or more three-dimensional pallet cells for the one or more three-dimensional item cells corresponding to an item.

5. The computer-implemented method of claim 4, wherein one or more location scores for the one or more placement locations are based further on an occupancy state for at least one three-dimensional pallet cell that is adjacent to the one or more three-dimensional pallet cells associated with the corresponding placement location.

6. The computer-implemented method of claim 1, wherein each three-dimensional cell of the plurality of three-dimensional pallet cells is associated with an occupancy state.

7. The computer-implemented method of claim 1, wherein each three-dimensional cell corresponds to a particular location on the pallet.

8. The computer-implemented method of claim 1, further comprising:
receiving, from one or more computing devices, an item characteristic data object for the one or more items of the plurality of items, wherein the item characteristic data object describes one or more item characteristics pertaining to the one or more items; and
wherein selecting the one or more placement locations is further based at least in part on the one or more item characteristics associated with each item of the plurality of items.

9. The computer-implemented method of claim 1, further comprising:
receiving, from one or more computing devices, an item characteristic data object for the one or more items of the plurality of items, wherein the item characteristic data object describes one or more item characteristics pertaining to the one or more items; and
wherein generating the plurality of three-dimensional pallet cells for the pallet is based at least in part on the item characteristic data object.

10. The computer-implemented method of claim 1, wherein the cell volume for each three-dimensional pallet cell is equivalent and wherein the cell volume is based at least in part on an item associated with a smallest item volume.

11. The computer-implemented method of claim 1, wherein causing the one or more prediction-based actions further comprises:

causing, using the one or more processors, one or more indications to be provided to one or more associated computing devices such that the one or more associated computing devices may place the one or more items on the pallet based at least in part on the one or more placement locations.

12. The computer-implemented method of claim 11, further comprising:
updating, using the one or more processors, an occupancy state associated with each of the one or more three-dimensional pallet cells based at least in part on one or more removal locations determined for the one or more three-dimensional pallet cells corresponding to the one or more items.

13. The computer-implemented method of claim 12, wherein updating the occupancy state of the one or more three-dimensional pallet cells further comprises:
receiving, from one or more computing devices, an item characteristic data object for the one or more items of the plurality of items, wherein the item characteristic data object describes one or more characteristics pertaining to the one or more items; and
determining, using the one or more processors, a portion of the cell volume that is occupied for each three-dimensional cell associated with the occupied state based at least in part on the item characteristic data object for the one or more items and a removal location for each item.

14. The computer-implemented method of claim 11, wherein the predictive machine learning model is trained using reinforcement learning techniques; and the computer-implemented method further comprises:
assigning a removal location comprising the one or more three-dimensional pallet cells for the one or more three-dimensional item cells corresponding to an item; and
determining a location score for the removal location for the one or more three-dimensional item cells corresponding to the item.

15. The computer-implemented method of claim 14, wherein the location score for the removal location is based at least in part on an occupancy state for at least one three-dimensional pallet cell that is adjacent to the one or more three-dimensional pallet cells associated with the removal location.

16. The computer-implemented method of claim 11, wherein each three-dimensional cell of the plurality of three-dimensional pallet cells is associated with an occupancy state, and wherein each three-dimensional cell corresponds to a particular location on the pallet.

17. The computer-implemented method of claim 11, further comprising:
receiving, from one or more computing devices, an item characteristic data object for the one or more items of the plurality of items, wherein the item characteristic data object describes one or more item characteristics pertaining to the one or more items; and
determining one or more removal locations based at least in part on the one or more item characteristics associated with each item of the plurality of items.

18. The computer-implemented method of claim 11, further comprising:
causing, using the one or more processors, one or more additional indications to be provided to the one or more associated computing devices such that the one or more associated computing devices may remove the one or more items on the pallet based at least in part on one or more removal locations.

19. An apparatus for determining one or more placement locations on a pallet for one or more items of a plurality of items, the apparatus comprising:

at least one processing component configured to:

generate a plurality of three-dimensional pallet cells for the pallet having a pallet volume, wherein the plurality of three-dimensional pallet cells is arranged to segment said pallet volume such that each three-dimensional cell is associated with a cell volume that is at least a portion of the pallet volume;

generate one or more three-dimensional item cells for each item of the plurality of items, wherein each item has a corresponding item volume, and wherein the one or more three-dimensional item cells for each item contains the corresponding item volume;

train a predictive machine learning model to select from the one or more placement locations each comprising one or more three-dimensional pallet cells for the one or more three-dimensional item cells corresponding to each item by utilizing at least one location score for at least one placement location for the one or more three-dimensional item cells, wherein the at least one location score is determined based on overall volume occupancy data of the pallet, wherein the overall volume occupancy data is determined based on a number of three-dimensional pallet cells that are associated with an occupied state, and wherein the at least one location score is increased when one of the plurality of items is placed in a placement location associated with a high occupancy of an adjacent three-dimensional item cells; and cause one or more prediction-based actions to be performed by a robotic arm on the one or more items based at least in part on the one or more placement locations.

* * * * *